US011160151B2

(12) United States Patent
Muehlschlegel et al.

(10) Patent No.: US 11,160,151 B2
(45) Date of Patent: Oct. 26, 2021

(54) CIRCUIT ARRANGEMENT FOR OPERATING A LOAD INCLUDING A LIGHT SOURCE

(71) Applicant: OSRAM GmbH, Munich (DE)

(72) Inventors: Joachim Muehlschlegel, Groebenzell (DE); Maximilian Schmidl, Pullach (DE)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/173,282

(22) Filed: Feb. 11, 2021

(65) Prior Publication Data

US 2021/0298149 A1    Sep. 23, 2021

(30) Foreign Application Priority Data

Mar. 19, 2020   (DE) .................... 10 2020 203 531.8

(51) Int. Cl.
*H05B 45/382* (2020.01)
*H05B 45/10* (2020.01)

(52) U.S. Cl.
CPC .......... *H05B 45/382* (2020.01); *H05B 45/10* (2020.01)

(58) Field of Classification Search
None
See application file for complete search history.

(56) References Cited

U.S. PATENT DOCUMENTS

2016/0302268 A1* 10/2016 Dunser ................. H05B 45/48
2018/0249539 A1*  8/2018 Saccavini ........... H04B 5/0025

FOREIGN PATENT DOCUMENTS

| DE | 145668 A1 | 12/1980 |
| DE | 102013226964 A1 | 6/2015 |
| DE | 102014107429 A1 | 12/2015 |
| DE | 102016208183 A1 | 11/2017 |

* cited by examiner

*Primary Examiner* — Dedei K Hammond
(74) *Attorney, Agent, or Firm* — Kilpatrick Townsend & Stockton LLP

(57) ABSTRACT

A circuit arrangement for operating a load includes a primary-side switched-mode converter with galvanic isolation of input and output voltage, having: a primary circuit, a secondary circuit and a power transformer, wherein: a first inductor and a second inductor, the first inductor being arranged in the secondary circuit in order to pass the current generated by the transformer when the energy is transferred to the secondary circuit, and the second inductor being interconnected in a measuring circuit. The second inductor is spatially arranged in a stray magnetic field generated by the first inductor; the measuring circuit has an output at which a measuring voltage is output, and the control device is connected to the output of the measuring circuit in order to determine a corresponding current flow from the output measuring voltage, and is configured to control the clocked operation of the switch depending on the current flow determined.

23 Claims, 9 Drawing Sheets

CIRCUIT ARRANGEMENT FOR OPERATING A LOAD INCLUDING A LIGHT SOURCE

CROSS-REFERENCE TO RELATED APPLICATION

This application claims priority to German Patent Application Serial No. 10 2020 203 531.8, which was filed Mar. 19, 2020, and is incorporated herein by reference in its entirety.

TECHNICAL FIELD

Various embodiments relate generally to a circuit arrangement for operating a load including a light source. The light sources can be, for example, light-emitting diodes (LEDs).

BACKGROUND

Generic circuit arrangements for operating a light source, e.g. an LED-containing load, are widely known. They are used e.g. in electronic control gear (ECG). Depending on the design and application area of such ECGs, due to the need to provide, for example, a safety extra low voltage (SELV), a galvanic isolation is required between the line-voltage side ("primary side") and the light-source side ("secondary side"). A galvanic isolation may also be necessary in the case of outdoor ECGs. In this case, it is important to ensure sufficient pulse voltage robustness in the event of thunderstorms. The galvanic isolation therefore entails the need for SELV or outdoor isolation.

For use in control gear with galvanic isolation, a wide range of types of electrical voltage converters is available, i.e., from primary switched-mode converters with galvanic isolation of primary-side input voltage and secondary-side output voltage, for example flyback converters or resonant converters etc. Common to these devices is that they contain a primary circuit with an input for the input voltage and one or more electronic switches for providing a pulsed current flow in the primary circuit, and a secondary circuit that is galvanically isolated from the primary circuit and has an output for connecting the load at which the output voltage is delivered, and finally, a power transformer is also provided which transfers the energy of a magnetic field, created in it by the pulsed current flow, from the primary circuit to the secondary circuit, thus rendering the energy usable for the connected load, for example one or more LED modules. The power transformer is designed according to SELV or outdoor requirements, i.e. equipped with appropriate isolation.

It also contains a control device that controls the pulsed operation of the electronic switch or switches. By way of example, in the case of dimmable control gear, for the control it is necessary to determine the load current actually flowing through the light sources on the secondary side, in order to be able to compare it with a current flow corresponding to the specified dimming value and to be able to adapt the energy transferred into the secondary circuit by the pulsed-mode operation.

The control device is typically a microcontroller, which has data and control interfaces (e.g. DALI, etc.) and should therefore be assigned to the primary side—e.g. also due to the connection to the electronic switches in the primary circuit. In this respect, an electrical connection that results in a measurement of the load current in the secondary circuit and delivers the result to the control device or the microcontroller must itself include galvanic isolation in turn, in order to meet the requirements of SELV or the specific outdoor isolation.

In order to avoid this expense, one approach could be to determine the current flow through the light source in the same way by measuring a current flowing in the primary circuit. This can be implemented, for example, by shunt resistors for current measurement, in which case the instantaneous current flow in the primary circuit is determined from the voltage drop across the shunt resistor. The load current can be inferred from this.

However, the tests carried out here show that for small dimming values (or dimming levels), i.e. for dimming values of less than approximately 5% to 10% of the load current flowing through LEDs, for example, this can only be carried out very inaccurately. One reason for this is that when dimming down to small dimming values of less than 10%, the current—i.e. the time-averaged value of the current—measured at the shunt resistance only reaches approximately 0% to 30% on the secondary side. As a result, the setting of a dimmed load current or LED current becomes very imprecise, and in any case barely satisfies the requirements for a dimming characteristic with regard to accuracy and stability.

At the lowest dimming values, the current measurement on the primary side (e.g. as described in the context of the measurement using a shunt resistor) is so imprecise that it cannot even be used to determine whether the connected light source, e.g. an LED module, is still emitting light at all. One of the reasons for this are the loss effects occurring at low dimming values, which can arise due to switching losses in the transistors of the primary circuit or due to the reactive currents flowing in the power transformer.

In this respect, the approach will offer little promise to the person skilled in the art and in the case of dimmable ECG will only rarely be pursued, if at all, and instead a link will e.g. be sought between the current measurement in the secondary circuit and a connection to the control device or microcontroller in the primary circuit while establishing a galvanic isolation. For this purpose, suitable current-measuring transformers exist which meet the strict SELV or specific outdoor requirements with regard to isolation, etc.

However, any such specific current-measurement transformers that are able to guarantee SELV isolation are generally complicated and expensive. In addition, these components take up a relatively large amount of space on the circuit board.

An alternative is circuit arrangements that enable current measurement in the secondary circuit with a connection to the microcontroller in the primary circuit using optocouplers. Such circuit arrangements are certainly common, but suffer from widely known problems associated with the operation of optocouplers, such as drift, aging, and relative inaccuracy.

SUMMARY

A circuit arrangement for operating a load includes a primary-side switched-mode converter with galvanic isolation of input and output voltage, having: a primary circuit, a secondary circuit and a power transformer, wherein: a first inductor and a second inductor, the first inductor being arranged in the secondary circuit in order to pass the current generated by the transformer when the energy is transferred to the secondary circuit, and the second inductor being interconnected in a measuring circuit. The second inductor is spatially arranged in a stray magnetic field generated by the first inductor; the measuring circuit has an output at which a measuring voltage is output, and the control device is connected to the output of the measuring circuit in order to determine a corresponding current flow from the output measuring voltage, and is configured to control the clocked operation of the switch depending on the current flow determined.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
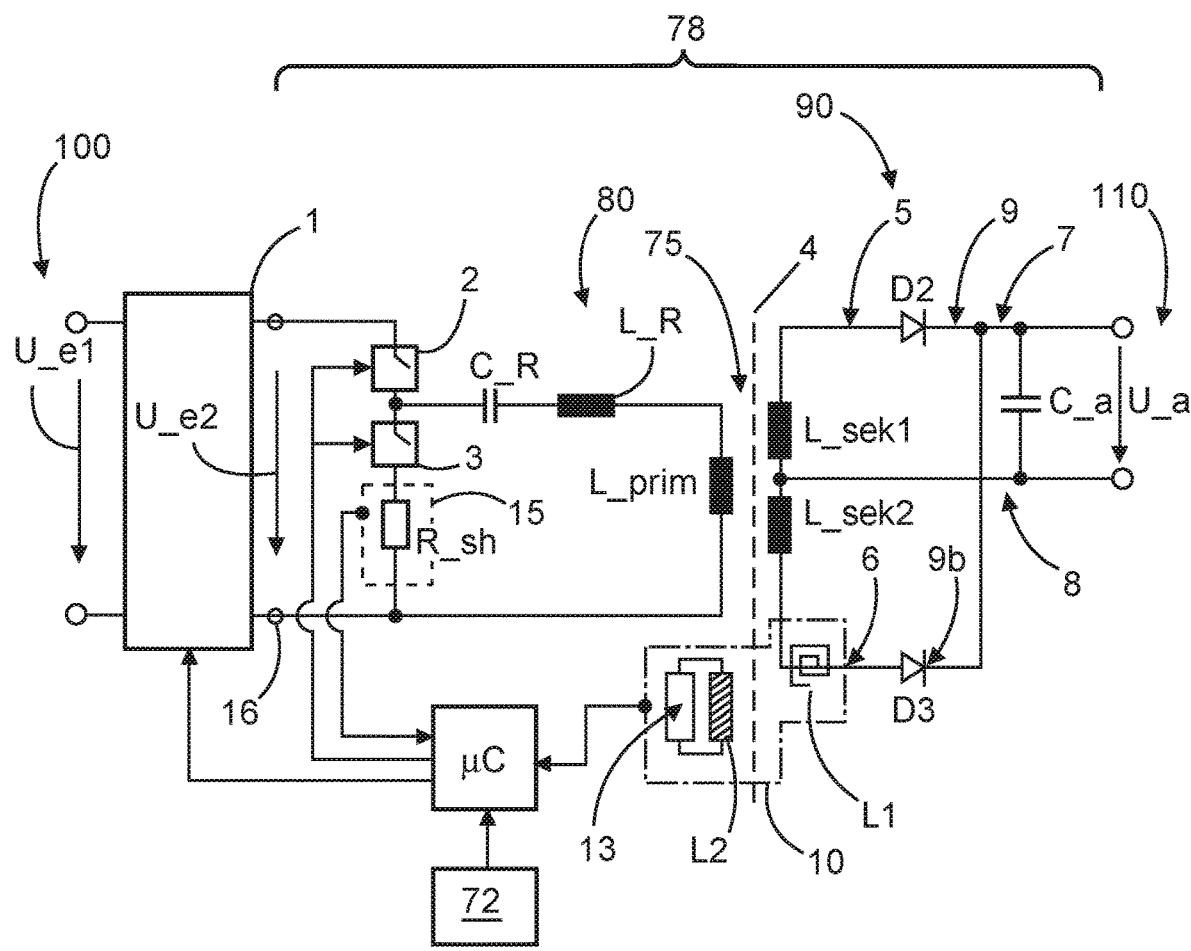
FIG. 1 shows a simplified schematic representation of an embodiment of a circuit arrangement in accordance with various embodiments.

FIG. 1 shows a schematic overview of a first embodiment of a circuit arrangement according to various embodiments for operating a load. The circuit arrangement shown essentially corresponds to an electronic control gear (ECG). The load, which can be, for example, one or more LED modules each with LEDs connected in series, is not shown. It is connected to the output 110 labeled with the output voltage $U\_a$.

The circuit arrangement has an input 100, which can be supplied with an input voltage $U\_e1$. This is connected to a power factor correction controller 1 as the first power stage, which can be a boost converter, for example. Its internal structure is not important to the description of the invention and is omitted here. Boost converters with a PFC function are sufficiently well known in the technical field. In this example, the power factor correction controller 1 is controlled by a microcontroller μC.

The power factor correction controller 1 supplies a DC voltage $U\_e2$ at its output as the input voltage for the subsequently connected converter. A primary electrical circuit 80 of an LLC resonant converter 78 is therefore connected to the output of the power factor correction controller 1. The LLC resonant converter 78 in turn converts its input voltage $U\_e2$ into the output voltage $U\_a$, which is used to supply the load.

The LLC resonant converter described here includes a resonant circuit including or consisting of components connected in series: a capacitor $C\_R$, an inductor $L\_R$ and an inductor $L\_prim$ of a power transformer 75. The basic structure and function of such a resonant converter is already known from textbooks and will therefore be only roughly outlined in the following. With two electronic switches 2, 3 (e.g. bipolar transistors or MOSFETs) connected in series between the terminal that supplies the potential of the input voltage and the terminal that supplies the reference potential, this resonant circuit can be fed alternately with the input voltage potential or the reference potential by means of suitable control of the switches by the microcontroller μC. By closing the first electronic switch 2 for a certain switch-on duration, the resonant circuit performs a half-oscillation and thereby charges up the capacitor $C\_R$, after which the switch 2 is opened again. After a short dwell time or dead time, the second electronic switch 3 is closed for the same switch-on duration, in order in turn to perform a half-oscillation with a discharge of the capacitor $C\_R$. During both half-oscillations in the primary electrical circuit 80, in the power transformer 75 energy is transferred from the inductor $L\_prim$ either to an inductor $L\_sek1$ or to the inductor $L\_sek2$ of the power transformer 75, which are connected in series in a secondary electrical circuit 90. The reference potential is tapped off at a node between the inductors $L\_sek1$ and $L\_sek2$ and fed to the corresponding terminal of the output 110. The opposite terminals of the inductors $L\_sek1$ and $L\_sek2$ are connected to anode terminals of diodes D2 and D3, which together act as rectifiers in the secondary circuit 90. Their cathode terminals are connected to the terminal of output 110, which supplies the output voltage potential. A filter capacitor $C\_a$ (e.g. an electrolytic capacitor) is connected between the two terminals of the output 110, which acts as a filter and smooths the output voltage $U\_a$.

The power transformer 75 electrically isolates the primary electrical circuit 80 from the secondary electrical circuit 90 (galvanic isolation 4). In order to satisfy the requirements for SELV extra-low voltages in the secondary circuit, the power transformer is designed according to the relevant safety standards with regard to insulation, etc., e.g. IEC61347.

With each half-oscillation, energy is transferred from the primary electrical circuit to the secondary electrical circuit. The energy transfer (power) is varied by the microcontroller via the switching frequency $f_s$ of the half-bridge which is formed by the switch 2 and the switch 3 (i.e., the dead time and the on-time of the switches are varied by the µC in accordance with the frequency $f_s$). One of the effects of such resonant converters is the low switching losses.

The electronic control gear can be dimmed by feeding a variably adjustable dimming value from a dimming device 72 to the microcontroller µC. In line with this dimming value, the microcontroller µC controls the switching frequency $f_s$ or the switching period $T_s$ with which it controls the two electronic switches 2, 3.

Figure 3:
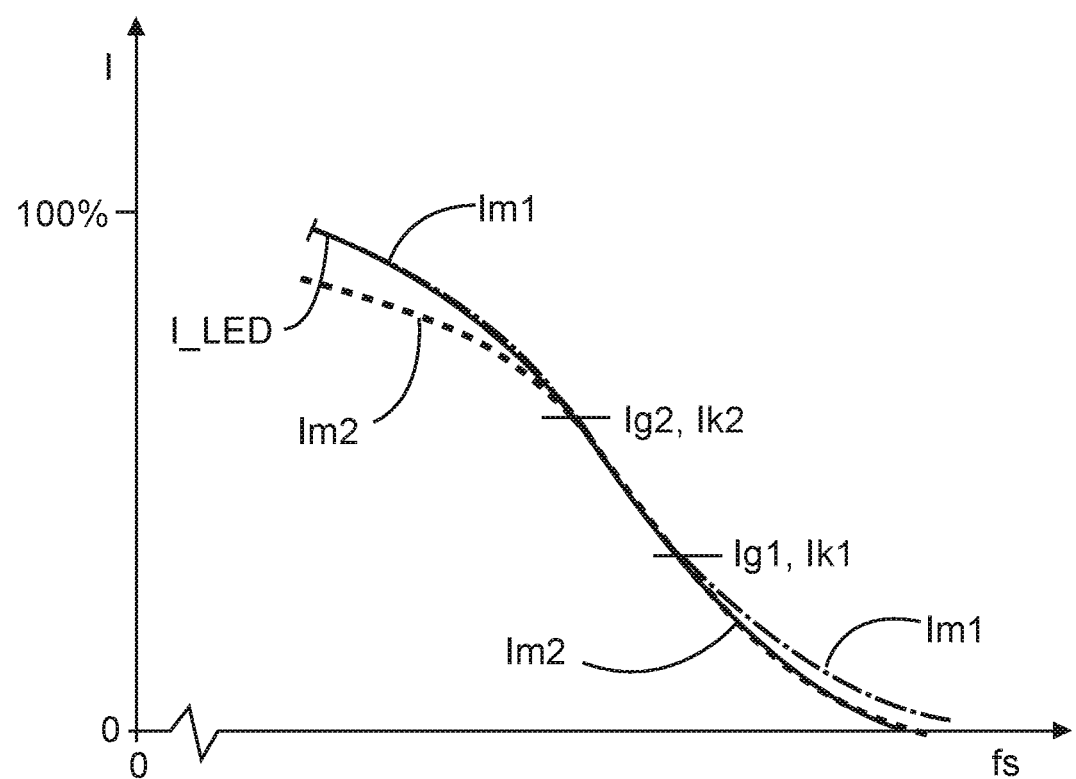
FIG. 3 shows a schematic diagram of an ideal dimming characteristic together with actually measured dimming characteristics for the current measurement in the primary circuit and in the measuring circuit.

The diagram in FIG. 3 shows a highly schematic representation of an ideal dimming characteristic I_LED as a solid line, i.e. the current flowing through the LEDs as load current as a function of the switching frequency $f_s$. In this case, the load current in the secondary circuit 90 increases with higher dimming values (to the left in the diagram) if a longer switching period is selected, i.e. the switching frequency decreases and therefore more power is transferred. The switching frequency for the desired dimming value (in % of the maximum load current) can thus be set by the microcontroller µC based on the dimming characteristic.

However, the microcontroller µC has no evidence about the actual load current. In order to perform a practical control, a first current measuring sensor 15 is provided on the primary side, with which the current flowing during its half-oscillation is measured by means of the electronic switches 2, 3 (in the example only the second electronic switch 3). In the example, the measurement is carried out via a shunt resistor R_sh, which in this case, purely as an example, is connected in series with the second electronic switch 3 between one terminal of the latter and the reference potential. Details of the electronic components that can be used for current measurement via a shunt resistor can be found in the relevant technical literature. The basic principle is to measure the voltage currently dropped across the very small ohmic resistance and then infer the current flow from this. The first current sensor 15 is connected to the microcontroller µC and supplies it with the measurements, from which the latter determines the current flow in the primary electrical circuit 80.

The first current sensor 15 can also be located at any other position in the primary electrical circuit 80, e.g. at the position 16 indicated in the circuit arrangement of FIG. 1.

In FIG. 3, for the circuit arrangement of the exemplary embodiment the (actual) dimming characteristic Im1 for the load current obtained from the measurement of the first current sensor 15 is drawn as a dash-dotted line, wherein at the points where it conforms to the ideal dimming characteristic, it is covered by the solid line of the ideal dimming characteristic I_LED. It is immediately apparent that below a dimming value corresponding to the current flow Ig1 ("lower limit"), the actual dimming characteristic for the current flow measured from the primary electrical circuit 80 via the first current sensor 15 deviates from the ideal dimming characteristic I_LED.

This means that at low nominal dimming values of e.g. 5%, a current Im1 is measured at the first current sensor that is too high. This means that at low nominal dimming values of e.g. 3%, due to the regulation being based on the first current sensor only, considerably higher switching frequencies are set than necessary, so that too little load current (and therefore too little LED current) is available on the secondary side. Above the lower limit value Ig1 for the current flow, however, the actual dimming characteristic Im1 and the ideal dimming characteristic I_LED correspond very closely and a satisfactory current regulation and current setting of the LED current is recorded.

Figure 2:
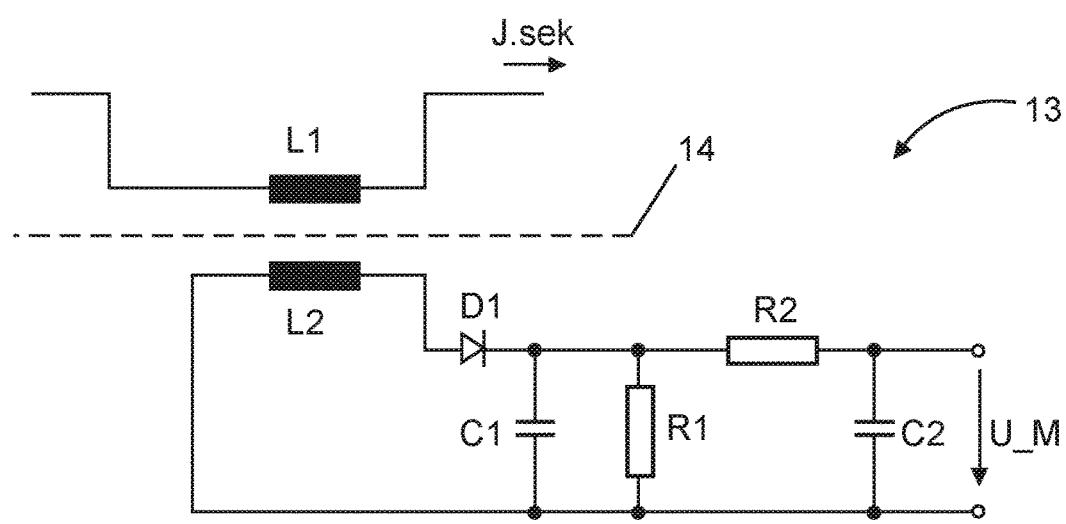
FIG. 2 shows a circuit sketch showing the second current sensor from FIG. 1 in greater detail.

A second current sensor 10 is now configured for the range of lower nominal dimming values, as can be seen in FIG. 1 and FIG. 2. This includes a first inductor L1, which is wired at a position 6 in the secondary circuit 90 (shown only schematically in FIG. 1), a second inductor L2, which is wired in a measuring circuit 13, and the measuring circuit 13 with its electronic components, which can be seen in more detail in FIG. 2.

The current sensor therefore includes the two inductors L1 and L2, which—according to one aspect of these embodiments—are assembled into an inductive measuring system during the manufacture of the circuit arrangement or the electronic control gear (ECG), for example during the PCB assembly.

In various embodiments, the first inductor L1 is connected, e.g. on the secondary side at position 6, between the terminal of the inductor L_sek2 of the power transformer 75 that is remote from the reference potential, and the anode terminal of the diode D3. Alternative mounting positions are also possible, for example, the positions 5, 7, 8 or 9 or 9b shown in FIG. 1. The important thing is that these positions are located on the side of the terminals of the filter capacitor C_a which faces toward the power transformer or away from the output 110 with the load connected, because the filter capacitor C_a smooths and filters the LED current, so that consequently smoothed or filtered current flows detected "behind" the filter capacitor C_a are not suitable for the current measurement, as the current here is no longer pulsed and a zero-current time segment is no longer present.

It is also important that the mounting position 5-9, 9b is located where the current or I_sek (in FIG. 2) is representative of the LED current I_LED. The current here flows in pulsed form, i.e., in the form of charge pulses for the output-side filter capacitor C_a. A zero-current time segment occurs between the charge pulses of I_sek. This time segment is necessary to demagnetize the transformer consisting of L1 and L2, i.e. the magnetic flux in the inductors L1 and L2 essentially returns to zero during the time segment. This is precisely the reason why positions at the output 110 of the filter capacitor C_a are less suitable because, as indicated above, the filter capacitor C_a, given an appropriate size, converts the pulse-shaped current into a smoothed current. The zero-current time segments would then disappear.

FIG. 2 further shows that the second inductor L2 in the current measuring circuit 13 of the second current sensor 10 is galvanically isolated from the first inductor L1 (see the galvanic isolation 14 in FIG. 2). One of its terminals is connected to the reference potential, its other terminal to the anode terminal of a diode D1, the cathode terminal of which is connected to the output terminal supplying the voltage potential to be measured. The capacitors C1, C2, together with the resistors R1, R2, form a low-pass, so that an output voltage U_M is obtained at the capacitor C2, which corresponds to the current flow generated in the second inductor L2 by induction. The second inductor L2 is arranged in the stray field of the magnetic field generated by the first inductor L1 in the secondary circuit, which is generated in the first inductor by the current flow I_sek in the secondary circuit. The current flow in the measuring circuit 13 thus follows the current flow in the secondary circuit at position 6 (or one of the positions 5, 7, 8 or 9 or 9b).

The current voltage U_M at the output of the measuring circuit of the microcontroller μC can be read out via an analog-to-digital converter, not shown (see FIG. 1). Due to the galvanic isolation 14 and the coupling to the microcontroller μC (or the control device of the circuit arrangement), the measuring circuit 13 of the second current sensor 10 is assigned to the primary side of the circuit arrangement or that of the LLC resonant converter 78.

FIG. 3 shows the resulting actual dimming characteristic Im2 (see the dashed curve) for regulating the clocked switching mode of the electronic switches 2, 3, this time based only on the current flow values determined by the second current sensor 10. It is apparent that from the lowest dimming value (lowest LED current) up to the dimming value corresponding to an upper limit value Ig2, the characteristic Im2 in fact lies directly on the solid curve of the ideal characteristic. The ideal dimming characteristic is therefore reproduced very well in this range with regulation based only on the second current sensor 10. However, it can also be seen that for dimming values corresponding to current flows above Ig2, the deviations of Im2 compared to the ideal dimming characteristic I_LED increase rapidly, i.e. the curves of Im2 clearly lie under the ideal dimming characteristic. For a specified nominal dimming value above this limit Ig2, the switching frequencies are set far too low, i.e. the power transferred becomes too high.

It should be noted that FIG. 3 already shows current flows Im1 and Im2 adjusted by multiplication factors, which produces comparability between I_LED, Im1 and Im2 in the diagram of FIG. 3.

LED Operation with "Hybrid Measurement" Using Both Current Sensors:

Based on the findings from FIG. 3, the idea underlying the embodiments is that for nominal dimming values above the first limit value Ig2, the regulation is performed only—or essentially—based on the first current measuring sensor 15, and for nominal dimming values below the first limit value Ig1, the regulation is performed only—or essentially—based on the second current sensor 10. In the range between the upper first limit Ig2 and the lower second limit Ig1, it is apparent (see FIG. 3) that both measurement data sources would provide satisfactory results in the case of appropriate regulation. For dimming values in this range, the regulation can therefore be operated both with the first current sensor only and with the second current sensor only, or—as described below—by way of example, based on both.

In the embodiment shown, during the operation of the ECG, a continuous current measurement is performed by the microcontroller μC via two current measurements for the continuous current regulation of the load current by the microcontroller μC, namely the current flow measured by the first current sensor 15 in the primary electrical circuit 80 and the current flow measured by the second current sensor 10 in the measuring circuit 13. A weighting should be performed in the range between Ig1 and Ig2. The weighting of the two current measurements in the microcontroller μC in the embodiment is dependent on the instantaneous nominal dimming value or I_LED, i.e., the operating point of the circuit arrangement or ECG.

A first "current-measurement1" is obtained by means of a measuring voltage from the shunt measurement of the first current sensor 15 on the primary side. This is used by the microcontroller μC if the current corresponding to the nominal dimming value is greater than the lower second limit Ig1, since the measurement here is closely correlated with the LED load current I_LED.

A second "current-measurement2" is obtained by means of a measuring voltage from the measurement transformer of the second current sensor 10 on the primary side. This is used by the microcontroller μC if the current corresponding to the nominal dimming value is less than the upper first limit Ig2, since the measurement here is closely correlated with the LED load current I_LED.

In the "hybrid measurement" described below, the weighting is selected in such a way that in the range in which the correlation between the respective current measurements and the actual I_LED is high, a correspondingly high weight is set for use as a measurement in the microcontroller μC.

In the range between the limit values Ig1 and Ig1, the transition for the weighting in the embodiment may be changed in a gradual manner in order to avoid abrupt changes in the light. The reasoning is that, due to drift or measurement inaccuracies etc., current-measurement1 and current-measurement2 can still be slightly different, even in this range, with regard to the current I_LED representing the nominal dimming value. Of course, the absolute measurement can be different for the two current measurements depending on the measuring range, since the microcontroller μC uses a separate ADC measuring channel for each measurement.

If during the ECG operation the microcontroller were to be abruptly switched between the current measurements to be used, if dimming limits were exceeded, jumps in the light value (flicker) would be observed if the current measurements deviate from each other. In the example this can be avoided by a sliding weighting.

For the current regulation therefore, the microcontroller μC uses the weighted total measurement, which is generated by weighting and summing the two measurements according to the following formula: Total measurement=GM1*current-measurement1+GM2*current-measurement2, where GM1=1 and GM2=0 for I_LED>Ig2, and GM2=1 and GM1=0 for I_LED<Ig1. The following applies in the entire current range: GM1+GM2=1. Here, GM1 is the weighting for the current-measurement1 and GM2 is the weighting for the current measurement2.

Figure 5:
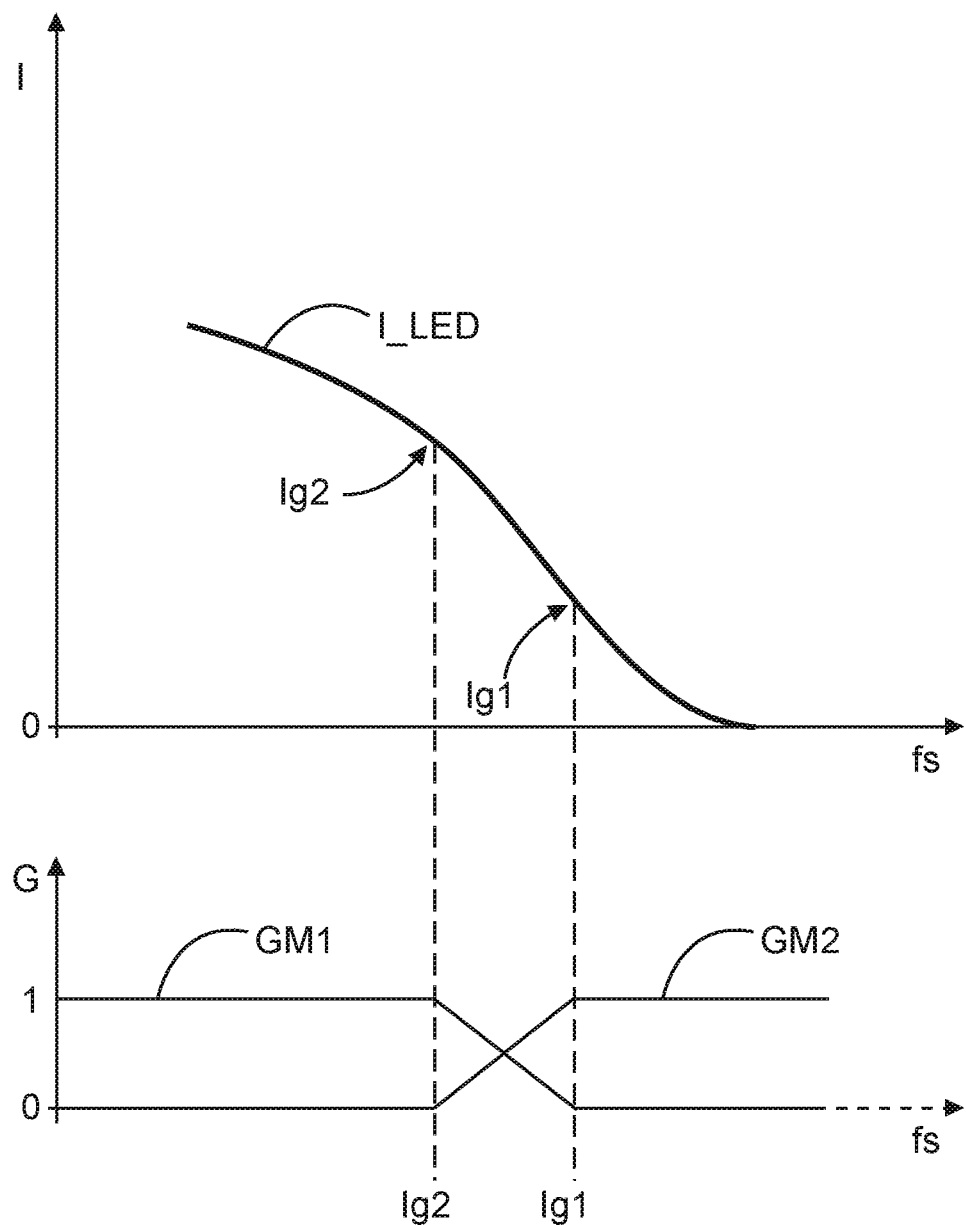
FIG. 5 shows a schematic diagram of the method of the weighting procedure carried out on the basis of the dimming characteristic.

A smooth weighting transition is used in the exemplary embodiment for the range between the upper first limit Ig2 and the lower second limit Ig1. The transition is linear. Other forms of transition are also possible. The associated function does not necessarily have to be linear, but should always be continuous and monotonic. The described exemplary embodiment with linear transition is shown in FIG. 5.

In tests, an advantageous range for the size of the lower second limit value Ig1 was found to be an interval of approximately 4% ... 50% of the 100% current of I_LED, i.e., for nominal dimming values of approximately 4% ... 50%.

For the size of the upper first limit Ig2 an interval of about 60% ... 5% of the 100% current of I_LED was found to be advantageous, i.e., for nominal dimming values of approximately 60% ... 5%. For combinations of Ig1 and Ig2, it is self-evident that the upper limit Ig2 is greater than the lower limit Ig1.

With these settings and using the weighting described above for the two measured current values, an essentially step-free LED operation was ensured and at the same time a very satisfactory regulation was obtained even for very small dimming values.

Automatic Calibration of the Measuring Arrangement Consisting of the Two Current Sensors:

Since the magnetic coupling of the inductors varies considerably due to the manufacturing process, e.g. due to the mechanical tolerances of the individual inductors, but also due to the mechanical tolerances during assembly, a calibration of the measuring system proposed here can be provided. This can be carried out at the time of production or automatically during operation of the ECG (automatic self-calibration).

The effect of this is that the calibration can essentially be carried out using a single calibration factor. This calibration factor compensates for the variance in the magnetic coupling (commonly known as the magnetic coupling factor of a transformer) and acts as a proportionality factor. The reason for this is that although the magnetic coupling factor varies, the measurement transformer still operates linearly in the range from the lowest current up to its linearity limit Ig2 or Ik2. In other words, up to Ig2 or Ik2, the output voltage of the measuring circuit is proportional to I_LED.

A further effect is that the magnetic coupling factor no longer changes, or only slightly, after assembly, since after assembly the measuring system and the magnetic transformer formed by L1 and L2 remain mechanically stable and fixed, and thus the magnetic coupling factor remains fixed.

The uncalibrated current measurement, which in the microcontroller µC represents the current to be measured in the current measuring circuit 13, is represented here by "current-measurement2$u$". The label "current-measurement2" is used to represent the corresponding calibrated current measurement. It should be noted that the "current-measurement1" and "current-measurement2" cited above are assumed here to be scaled in such a way that in an ideal measurement they correspond to the LED load current I_LED, i.e. they have the same scaling as this.

Figure 4:
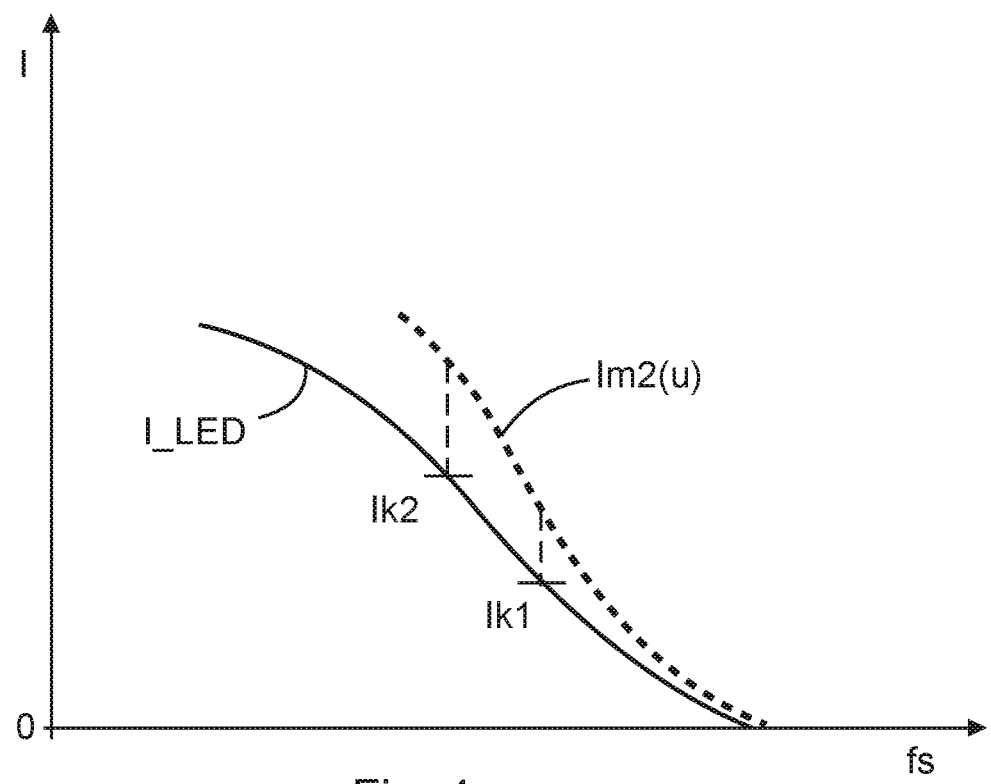
FIG. 4 shows a schematic diagram of the calibration procedure carried out on the basis of the ideal dimming characteristic and an as yet uncalibrated characteristic in the measuring circuit.

Using FIG. 4 the following text describes the automatic self-calibration with respect to the second current sensor 10 during the operation of the circuit arrangement or the ECG, which is performed by the microcontroller µC.

For the calibration, the microcontroller µC compares the continuously measured current-measurement1 with (the uncalibrated) current-measurement2$u$. In the calibration range, the value current-measurement1 corresponds to the load current I_LED. Likewise, the uncalibrated current-measurement2$u$ obtained from the current sensor within the calibration range also corresponds to I_LED except for a calibration factor (KAL).

The measurements of the second current sensor are only calibrated if the load current I_LED is within a certain calibration range, for which the current flow I_LED corresponding to the nominal dimming value is in the range Ik1<I_LED<Ik2. Ik1 and Ik2 represent a lower and an upper limit, similar to Ig1 and Ig2 above. Ik1 and Ig1 can be identical. Likewise, Ik2 and Ig2 can be identical.

The calibration range is the range of dimming values and/or current flows I_LED and/or switching frequencies $f_s$, in which the two ranges A and B, as defined below, overlap:

Range A is the range of dimming values or current flows I_LED or switching frequencies $f_s$ in which current-measurement1 correlates well with the dimming value or current flow I_LED, i.e. no deviations can yet be detected. The range is defined by dimming values or current flows I_LED to be achieved, for which the following applies: I_LED>Ik1.

Range B is the range of dimming values or current flows I_LED or switching frequencies $f_s$ in which current-measurement2 (or current-measurement2$u$ KAL: see below) correlates well with the dimming value or current flow I_LED. This is the case for the range of dimming values or current flows for which the following applies: I_LED<Ik2. An exemplary value for the choice of the lower second limit value Ik1 lies in the range of approximately 4% to 50% of the 100% current of I_LED. An exemplary value for the choice of the lower first limit value Ik2 lies in the range of approximately 5% to 60% of the 100% current of I_LED.

The calibration factor KAL mentioned above can now be determined in the microcontroller µC as follows: in the calibration range (i.e., overlap range of A and B, i.e. between the dimming limits Ik1 and Ik2), the microcontroller µC calculates the calibration factor KAL=current-measurement1/current-measurement2$u$, wherein it has (continuously) determined the measurements beforehand based on the two current sensors 10 and 15.

In a second step of the calibration, the calibration factor KAL is multiplied by the value of current-measurement2, so that the following equation is satisfied:

Current-measurement2=Current-measurement2$u$*KAL.

In other words, in the calibration range between the limits Ik1 and Ik2, the microcontroller µC uses current-measurement1 as the reference value for the calibration and adjusts current-measurement2$u$ accordingly by means of a calibration factor KAL so that it agrees with the reference value. This calibration value can then also be applied to dimming values outside the calibration range, where there is no longer a good correlation between the first current sensor and I_LED, in order to calibrate the measured current flows of the second current sensor (however, this will only make sense for dimming values below the lower limit value Ik1 or Ig1.

The value of current-measurement2 obtained after the calculation is the calibrated measurement obtained by the microcontroller µC from the measuring system, or from the second current sensor after ADC conversion and appropriate internal digital scaling. The microcontroller µC then uses this value as the actual value for the current regulation relative to the nominal dimming value I_LED.

The calibration factor KAL determined in each case can be stored in the microcontroller µC and then multiplied by the value of current-measurement2$u$ corresponding to each successive measurement of the voltage. This can be continued until such time as a new automatic calibration is performed. In the new automatic calibration a new calibration factor KAL will be determined and stored according to the same procedure as described above, and then used again until the next automatic calibration. This is repeated continuously during operation. In other words, the calibrated current-measurement2=current-measurement2$u$*KAL is used after the calibration process for the current regulation of the LED current that is permanently running in the microcontroller µC, and the calibration process for calculating the calibration factor KAL is only repeated in an event-driven way.

FIG. 4 shows examples of the ideal dimming characteristic I_LED and the characteristic curve for current-measurement2$u$ before the calibration, in a purely schematic form. Before calibration, for example, the following applies approximately in the calibration range: I_LED=Current-measurement1=2/3*Current-measurement2$u$, i.e. in this simple example, the calibration factor KAL is approx. 2/3.

Calibration of the Measuring Arrangement in Advance, i.e., During Manufacture:

A calibration can also be carried out as early as the manufacturing stage, or at least prior to the initial deployment of the circuit arrangement or the ECG. The automatic calibration as described above can then be omitted (but does not need to be). On the other hand, the automatic calibration would have the effect of taking account of environmental influences on the variances, e.g. in the second current sensor 10. In principle, two approaches are available:

The two corresponding procedures are essentially identical to the automatic calibration procedure in operation as described above, except that the calibration is not carried out automatically in operation, but before the first use of the ECG instead. The circuit arrangement or ECG is then operated for a short period of time in the calibration range (overlap range of A and B, see above), e.g. with a setting of the nominal dimming value of 30%. The calibration procedure in the microcontroller µC is controlled or triggered via a digital bus (e.g. DALI) or a digital NFC communication, or a similar signal. When the trigger signal is detected, the microcontroller µC compares the current-measurement1 value recorded by the first current sensor 15 as a reference value with the current-measurement2$u$ value measured at the same time, and then performs the calibration using the same steps as described above. In this case, KAL is determined once by the microcontroller µC, stored centrally and used permanently as a calibration factor in subsequent operation, in order to determine the calibrated current-measurement2, i.e. it is not repeated and continuously recalibrated automatically during operation.

As a variant of the procedure described above, a calibration can also be performed without determining a reference current measurement internally to the circuit. In this case, the reference measurement (i.e. that which replaces current-measurement1) is determined by an external measuring device, i.e., outside the ECG, by determining the current I_LED with high accuracy. This reference value is transmitted via digital communication (digital BUS, in particular DALI, or NFC) to the ECG and its microcontroller µC. This has the effect that the internal measurement of current-measurement1 can be omitted. However, in this case, the measuring arrangement must be designed in such a way that it can proportionally reproduce the current up to a value corresponding to the dimming value of 100%.

Event-Driven Automatic Calibration:

For example, an automatic calibration can be initiated periodically after a certain time interval, or in response to the detection of an event by the microcontroller µC. For example, on the transition from the light="OFF" state, in which the ECG is in standby mode, to the light="ON" state, in which the ECG is in operation, e.g. in dimming mode. Once initiated, the steps of the automatic calibration are performed as described above. However, the calibration here takes place immediately upon the switching on operation, e.g. of the LED light.

At the transition from the light="OFF" state to the light="ON" state with a specified (by the user) target dimming value for the current I_LED_target, a calibration procedure with a very short time period T_cal is performed before the actual operation in the light="ON" state. The time period is chosen so that this calibration process is not or is barely perceptible to the human eye when the light is switched on. For this purpose, a pre-determined nominal dimming value I_LED=I_LED_cal is initially set in the ECG for this time period T_cal immediately the light is switched on. In an optional design, the dimming value I_LED_cal can be set in the range I_LED_cal=(1 . . . 1.3)·I_k1. The lower second limit I_k1 represents the minimum current value at which a meaningful calibration is still possible (see above description of the calibration range).

The time period T_cal must be chosen as short as possible, i.e. only as long as the microcontroller µC needs to carry out the calibration. The time duration T_cal depends mainly on the A-D conversion and the measurement acquisition in the microcontroller µC. However, the time period T_cal lasts at least long enough for the two current measurements, i.e., the current-measurement1 as reference and the current-measurement2$u$ as the value to be calibrated, to remain valid, i.e., stable and in a steady state, in the microcontroller µC after the A-D conversion.

Calibration Followed by Compensation Light-Dimming Phase:

In order to further improve the non-perception of the calibration by the human eye, in addition to the measures described above (short calibration period), immediately after the expiry of the calibration period T_cal at the predetermined dimming or current value I_LED_cal for a period T_comp, a dimming value corresponding to the current flow I_LED=I_comp can be set by the microcontroller µC, in which the current flow I_LED_cal is compensated for the eye.

The compensation time duration T_comp and the corresponding compensating current flow I_comp are dimensioned such that the mean value of the light from the beginning of the time segment corresponding to the duration T_cal to the end of the segment corresponding to the duration T_comp is equal to the mean value of the nominal dimming value I_LED_target that was set by the user.

The current flow I_comp, which compensates for the calibration, can be advantageously chosen as follows: I_comp=(0 . . . 0.2)*I_LED_target. The corresponding duration is e.g.: T_cal+T_comp<100 ms=1/(10 Hz). By way of example, the sum of T_cal and T_comp is less than 20 ms.

This causes the mean value of the light during the period from the beginning of calibration to the end of the compensation phase to appear to the eye as the same or almost the same as the subsequent target light value. The sum of the durations T_cal and T_comp is chosen short enough that the two different light values are barely able to be integrated or averaged by the eye, and are therefore not yet perceived as flicker.

In a non-limiting example, the target dimming value I_LED_target=20 mA and the lower second limit I_k1=100 mA, the calibration current flow I_LED_cal=100 mA (i.e., identical to Ik1), the compensating current flow is I_comp=0 mA, and the calibration time is T_cal=1 ms. Because the target dimming value I_LED_target=20 mA should be equal to the mean value during the calibration and the compensation phase, the following therefore applies to the averaging: 20 mA=(1 ms·100 mA+X ms·0 mA)/(1 ms+X ms). "X" is the desired duration for the compensation phase, the compensation current is set to zero to keep the compensation phase as short as possible. From this, the calculated duration for the compensation phase is T_comp=4 ms, and the total duration T_cal plus T_comp is 5 ms.

The procedure is advantageously carried out when switching on the light, since here the eye perceives the switch-on operation (i.e. the transition from light="OFF" to light="ON") as a time-limited light flicker in any case. The calibration causes the flicker perceived by the eye to appear very similar or identical to the normal light flicker that occurs when the light is switched on without calibration.

The procedure described is not limited to the time of switching on the light. It can also be carried out during operation, for example, upon a change of an operating parameter, such as a temperature, acquired by a sensor (not shown, connected to the microprocessor, e.g. via DALI or NFC, etc.), which is greater (or smaller, as the case may be) than a critical limit, or upon the expiry of a time interval, or simply by the target dimming value being changed by the user, etc. In these cases, the averaging and setting of a short calibration and compensation period with T_cal+T_comp<20 ms may be provided.

The calibration can also be carried out after the detection of a change in the dimming value specified by the control device, wherein the calibration is only performed when the modified specified dimming value lies in an interval between 4% and 60% of a current flowing at full LED current without dimming, e.g. between 10% and 30% of the current flowing at full LED current without dimming, inclusive of the interval limits in each case. The effect here also is that this is exactly the time when no changes in brightness (flicker) occur.

Non-Proportional Behavior:

As a variant of the described calibration procedures according to the invention, which up to now have assumed an essentially linear-proportional behavior of the measuring arrangement with the achieved load current, applications for current ranges can also be considered, particularly for high current flows, where, for example due to a kind of saturation behavior of the measuring arrangement, this proportionality no longer obtains. In the very high current range, for example in the range of dimming values from 80% to 100% of current flow, the current flow can deviate according to a pre-determined non-linear function I_LED=f(current-measurement2). By means of such a pre-determined known function, the microcontroller μC can automatically compute or emulate the current flow I_LED currently objectively present during the ECG operation.

This function can have a correction polynomial, for example, as follows: $I\_LED = a \cdot MW^3 + b \cdot MW^2 + c \cdot MW^1 + d$. Here, "MW" stands for the quantity current-measurement2 determined or detected by the second current sensor and subsequently calibrated. The parameters a, b, c, d are determined for the measuring arrangement in the laboratory (i.e. when designing the ECG). This method variant, which takes into account the non-linear behavior, can be combined with a method as described above, i.e. the calibration should be carried out in addition to the correction for the non-linear behavior, because a calibration is indicated whenever the magnetic coupling varies during assembly (and from component to component).

Physical Structure of Components of the Circuit Arrangement:

FIG. 6A to FIG. 10B show exemplary embodiments of the circuit arrangement described above with regard to the physical structure of the second current sensor 10 and/or its transformer.

Features common to the individual components, in particular the inductors L1 and L2, as well as the insulation supporting the galvanic isolation 14, which are ultimately assembled to form the inductive measuring sensor as part of the manufacturing process, are as follows:

The second current sensor 10 includes two inductors, each of which is available on the market as a standard component and/or can be manufactured in large quantities according to specifications. An example are BC inductors or RF inductors from the company Epcos. These inductors are particularly compact and inexpensive and also easily available. The construction of the inductors L1, L2 in terms of layout and material is designed in such a way that the magnetic coupling after assembly is as good as possible, wherein the necessary insulation between the inductors L1, L2 must be observed.

In the state prior to being assembled on the printed circuit board or circuit board, the inductors have a comparatively large stray field in contrast to an inductor design with a closed ferrite core, such as with an E-core, RM core or ring core. The inductors L1, L2 of the exemplary embodiments shown in FIG. 6A to FIG. 10B have a magnetic stray field similar to the stray field of a magnetic dipole, such as a bar or core with a magnetic north pole/south pole.

The shape of the inductor core (ferrite) can be, for example, bar-shaped, dumbbell-shaped or U-shaped. As a result, after assembly the stray fields of the inductors L1, L2 have a relatively good coupling to each other (under the circumstances). The magnetic coupling factor k is in the range 0.98 to 0.05 (e.g. 0.98 . . . 0.1). The inductors can have a bar-shaped or dumbbell-shaped design, i.e., with an axial or radial configuration. The ratio of length to outer diameter of the ferrite material can range from 10:1 to 10:7. An exemplary ratio is approximately 10:4. Other embodiments or modifications may exhibit other ratios. For example, the lengths may be 2 mm to 40 mm, the diameters e.g. 1 mm to 10 mm.

According to various embodiments (see FIG. 6A to FIG. 8), one inductor L2 is printed on the printed circuit board or circuit board, e.g. as a copper track, while the other inductor L1 is configured as a standard wired component (or an SMD component) on the printed circuit board.

With regard to the mechanical arrangement and assembly of the current sensor during manufacture, this is implemented with the minimum possible separation, so that the best possible inductive coupling is achieved. With regard to the SELV/outdoor requirements, the aim is to achieve the lowest possible but still permissible separation between the electrically conductive parts according to the safety requirements for the necessary insulation of the inductors from each other, for example the copper windings or the supply lines or the ferrite core. The separation must be sufficient to achieve the necessary insulation for SELV/outdoor requirements.

The separation on the printed circuit board is chosen in such a way that after assembly the stray fields of the inductors exhibit a relatively good coupling with the coupling factors k specified above in the range 0.98 to 0.05 (e.g. 0.9 . . . 0.1). The selection of the separation takes account of the fact that the electrically conductive parts of the inductors L1, L2 can be insulated from each other with an insulator of material thickness D_iso made of insulating material, such as a foil or a plastic plate or wall, in order to meet the SELV/outdoor requirements. In various embodiments with a combination of a printed coil and a wired or SMD inductor, the insulator is provided by the printed circuit board.

In the case of a combination of two wired components or SMD components, a slot can be formed between the inductors in the printed circuit board on which the inductors are mounted, for example by slit milling. The slot has a thickness Ds>D_iso. In this slot, an insulator with thickness D_iso is inserted between the mounted inductors L1, L2. The slot is used to enhance the creepage and air distances in all directions required to comply with SELV/outdoor requirements. Accordingly, the position, length and height of the insulator can be dimensioned in such a way that in all directions (i.e., above the printed circuit board and below the printed circuit board as well as to the left and right of the components), the necessary creepage and air distance is maintained between the electrically conductive parts of the inductors L1, L2 on the primary and secondary side with length L_LuKr≥L_min(selv), where L_min(selv) is the minimum requirement resulting from the relevant standards and depends, for example, on the applied operating voltage and on the overvoltage category.

In the case of the galvanic isolation 14 present here, which meets the SELV requirements (i.e., in the case of an ECG with SELV output), the thickness D_iso of the insulator and the creepage and air distances are designed according to the relevant standards.

In the case of a 250V line voltage, the following apply: the minimum creepage distance L_min is 5 mm, and the minimum air distance L_min is 3 mm. The thickness of the insulator D_iso (in the case of solid material) should be 0.4 mm to 1 mm, with e.g. values being 0.8 mm to 0.9 mm. The overall thickness of D_iso (i.e., with multiple layers) should be 0.25 mm or more. These ranges of values compliant with the standards are accordingly intended as advantageous designs of the invention with regard to the inductors L1, L2 and the insulator.

Figure 6A:
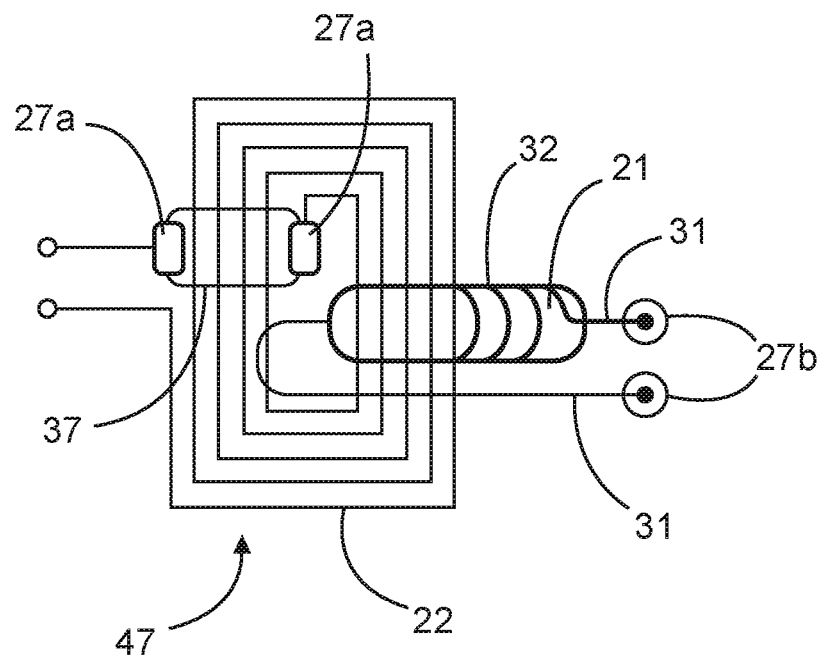
FIG. 6A shows a plan view of a first embodiment of the measuring arrangement of the second current sensor from FIG. 2.
Figure 6B:
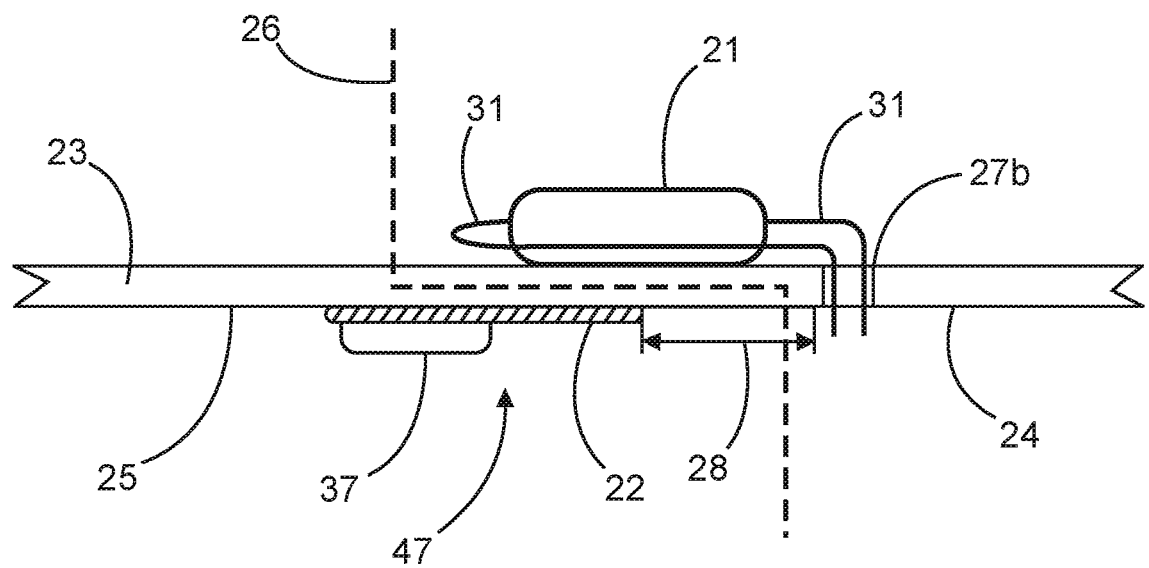
FIG. 6B shows the measuring arrangement from FIG. 6A, but in side view.

A first embodiment of a second current sensor 10 or its transformer components is shown in FIG. 6A and FIG. 6B. FIG. 6A shows the assembled current sensor 10 (i.e., its transformer components) in plan view, and FIG. 6B shows the assembled current sensor 10 (i.e., its transformer components) in side view. The components shown can be interconnected in the circuit arrangement according to the embodiment in FIG. 1. The inductor L1 of the current sensor 10 on the secondary side in FIG. 1 corresponds to the inductor 21 in this and the following embodiments. The inductor L2 of the current sensor 10 on the primary side in FIG. 1 corresponds to the inductor 22 in this and the following embodiments.

In this first embodiment of a second current sensor 10, the first inductor L1 or 22 is designed as a printed coil 47 on the printed circuit board. The inductance of this is L=0.5 μH. The printed circuit board itself acts as the insulator here (galvanic isolation 26) between the primary side 24 and the secondary side 25 of the circuit arrangement of the converter 78. The electrical connection of the internal bonding wire or the corresponding solder pad 27 (or 27a) of the printed coil 47 (first inductor L1 or 22) to the outside on the secondary side 25 on the printed circuit board is made via an SMD bridge 37.

On the primary side 24, the inductor L2 or 21 is designed as a horizontal wired inductor. It is connected to the printed circuit board by bonding wires 31 which extend from solder pads 27b. The air and creepage distance 28 to be maintained between the printed coil 47 and the solder eyelet 27b of the via of the wired inductor (second inductor L2 or 21) in accordance with SELV/outdoor requirements is also indicated in FIG. 6B.

The inductor L2 or 21 of the first embodiment for a second current sensor 10 has an inductance of L=4,700 μH. The design is similar to the B78108-S type BC from the Epcos company. With reference to FIG. 2, the measuring circuit 13 for this exemplary embodiment is designed as follows: diode D1: type 1N4148; resistor R1: 1 kOhm; capacitor C1: 330 nF; resistor R2: 6.8 kOhm; capacitor C2: 22 nF.

Figure 7A:
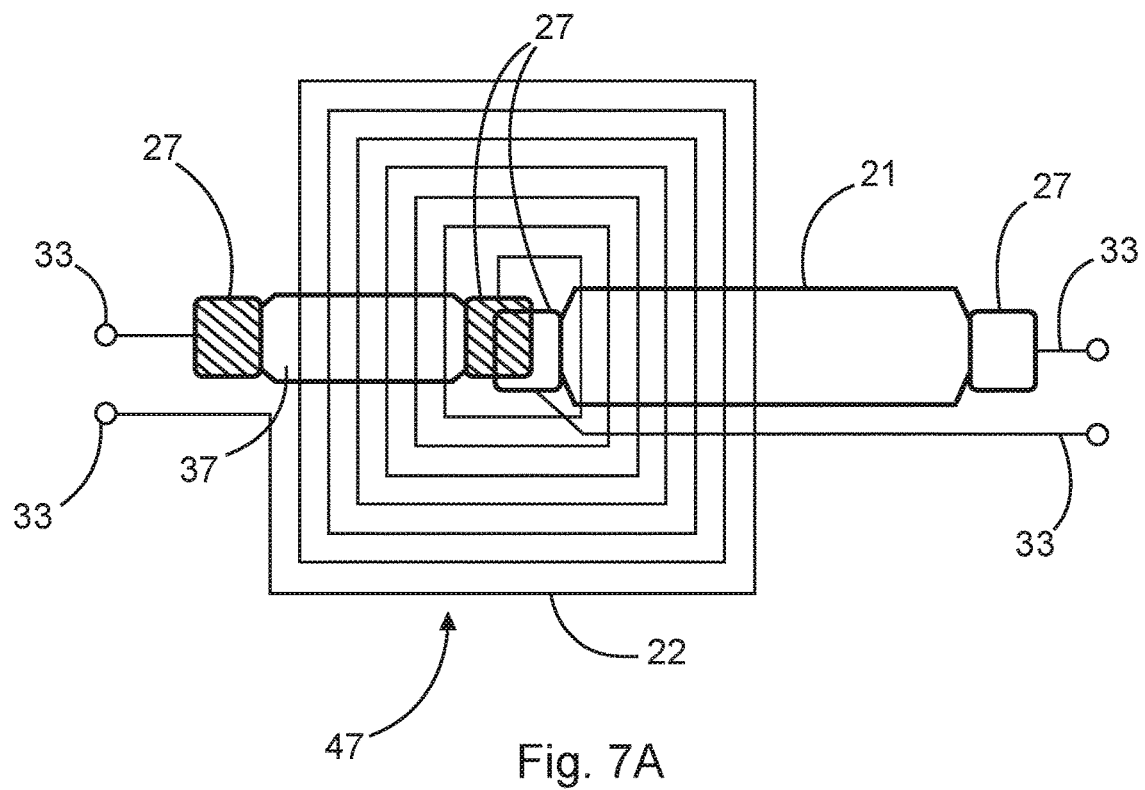
FIG. 7A shows a plan view of a second embodiment of the measuring arrangement of the second current sensor from FIG. 2.
Figure 7B:
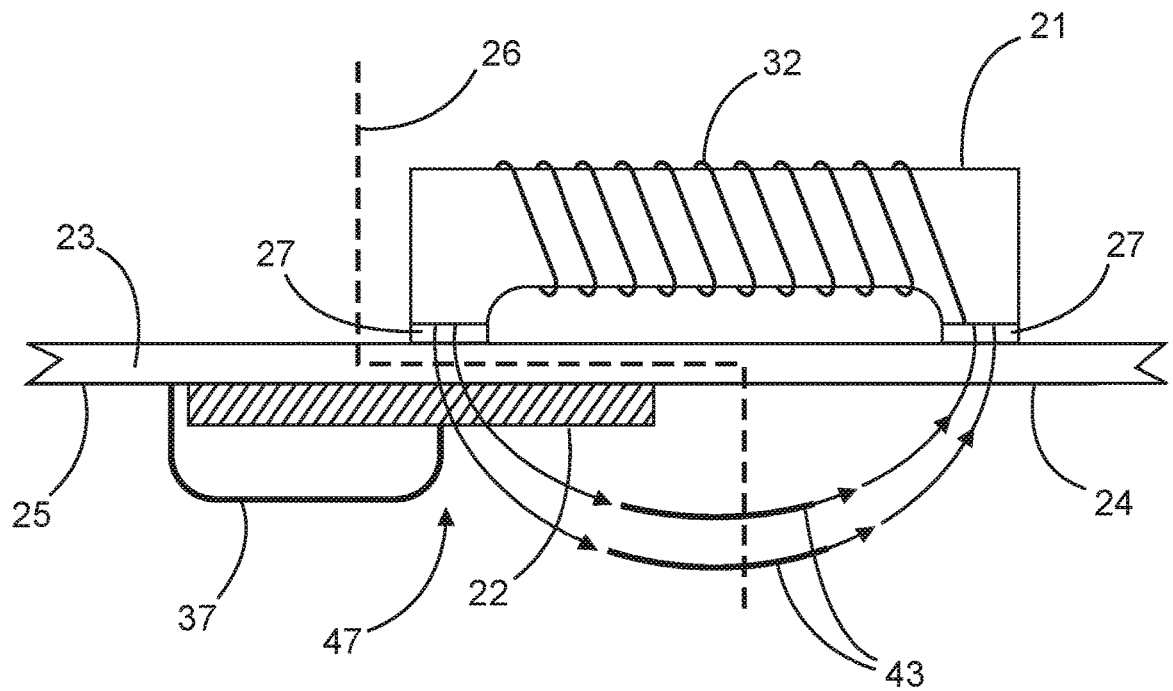
FIG. 7B shows the measuring arrangement from FIG. 7A, but in side view.

A second embodiment of a second current sensor 10 that can be used in the circuit arrangement according to FIG. 1 is shown in FIG. 7A and FIG. 7B. The same reference signs are used for identical or similar components in this and all following embodiments, and reference is made to the corresponding description of the other embodiments to avoid repetition.

The first inductor L1 or 22 on the primary side 25 is essentially identical to the design of the first embodiment according to FIG. 6A and FIG. 6B, including the SMD bridge 37 which connects the inner terminal 27 of the printed coil 47 to the corresponding terminal conductor track 33 on the printed circuit board. In contrast to the first embodiment, the second inductor L2 or 21 on the primary side 24 here is not designed as a wired inductor but as a horizontal SMD inductor. Here also, the printed circuit board itself acts as an SELV-standard compliant insulator between the primary side 24 and the secondary side 25.

FIG. 7A shows the assembled current sensor 10 (i.e., its transformer components) in plan view, and FIG. 7B shows the assembled current sensor 10 (i.e., its transformer components) in side view. As in the first embodiment, it is apparent that the second inductor L2 or 21 is mounted on the top side of the circuit board, while the first inductor L1 or 22 is mounted on the underside of the circuit board. In the side view of FIG. 7B, the field lines of the magnetic stray field generated by induction are also shown in schematic form. The first inductor L1 or 22 on the secondary side 25 in this case is positioned under the second inductor L2 or 21 in such a way that (under the circumstances of the stray field) as high a magnetic coupling factor as possible is obtained, i.e. a best possible coupling of the stray flux of the two inductors. This can be achieved here by the fact that the first inductor L2 or 21 is permeated by as many field lines 43 as possible starting from the one near pole of the magnetic dipole of the second inductor L1 or 21. For this purpose, the position and diameter of the printed coil 47 of the first inductor L1 or 22 on the secondary side 25 are dimensioned in such a way that the outermost winding reaches approximately as far as the center below the second inductor L2 or 21 on the primary side 24. If it were to extend beyond the center, the magnetic flux of the second inductor L2 or 21 on the primary side 24, which passes through the second inductor L2 or 21, would be reduced again due to cancellation effects when the same field line penetrates the plane of the second inductor L2 or 21 again on the secondary side 25 in the opposite direction.

Figure 8:
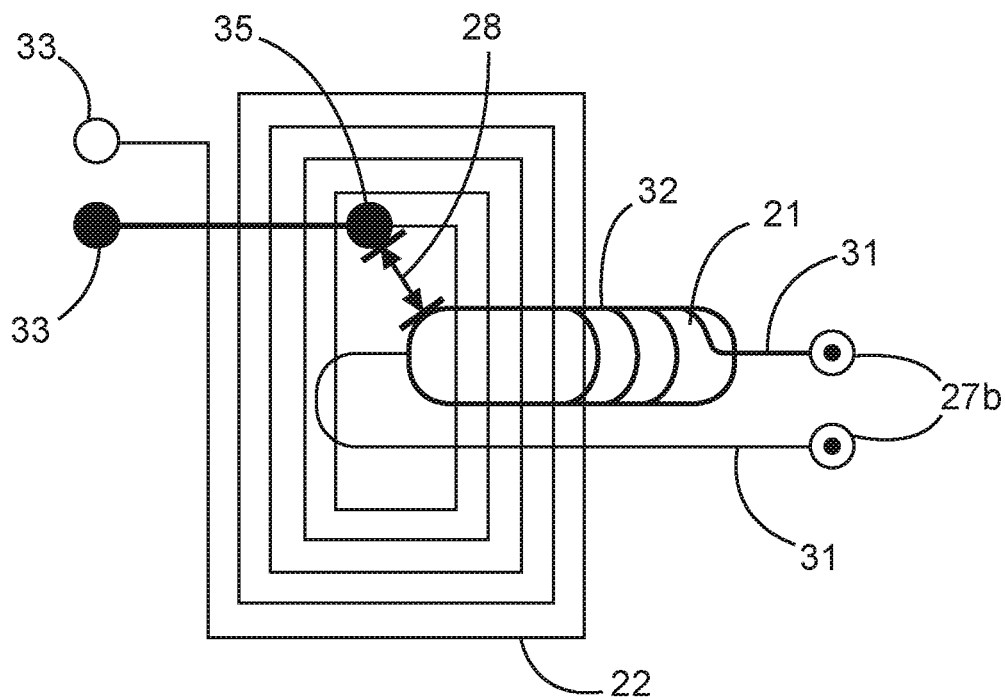
FIG. 8 shows a plan view of a third embodiment of the measuring arrangement of the second current sensor from FIG. 2.

A third embodiment of a second current sensor 10 that can be used in the circuit arrangement according to FIG. 1 is shown in FIG. 8. Only the plan view is shown here. The reference sign 32 shows the winding of the second inductor L2 or 21, here implemented again as a wired inductor, on the primary side 24. The first inductor L1 or 22 is again designed as a printed coil 47, however in this embodiment the connection from the inner terminal of the printed coil 47 to the connection point of the conductor track 33 on the same main surface of the printed circuit board is implemented by a conductor track bridge 34 on the rear of the printed circuit board, i.e. on the opposite side of the printed circuit board to the printed coil 47. This is possible by means of a via 35. The air and creepage distance 28 to be maintained between this via 35 and the winding 32 of the second inductor L2 or 21 in accordance with SELV/outdoor requirements is also indicated in FIG. 8.

Figure 9:
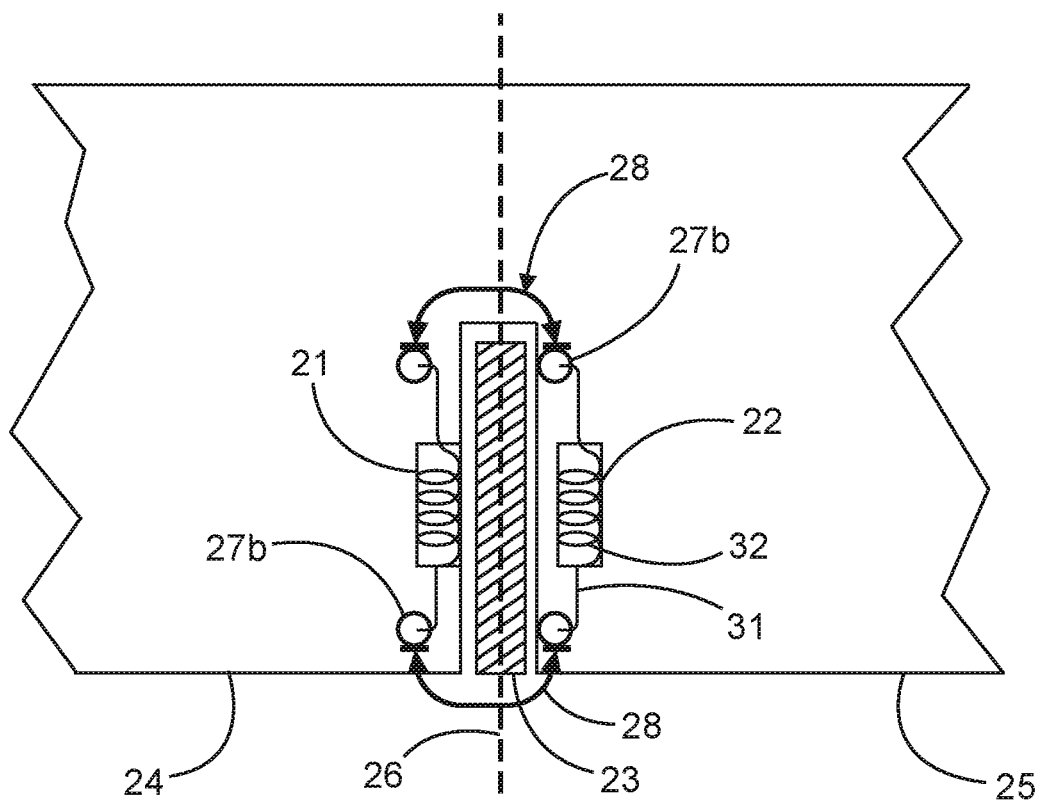
FIG. 9 shows a plan view of a fourth embodiment of the measuring arrangement of the second current sensor from FIG. 2.

A fourth embodiment of a second current sensor 10 that can be used in the circuit arrangement according to FIG. 1 is shown in FIG. 9. Here, also, only the plan view is shown. The embodiment shows two horizontal inductors (first inductor L1 or 22 and second inductor L2 or 21) with an intervening insulator 23, which this time is different to the circuit board. Both inductors are wired. As described above, a slot with the thickness Ds is formed in the printed circuit board, into which the insulator 23 with thickness D_iso<Ds is inserted in order to insulate the two inductors L1 and L2 for the purpose of galvanic isolation 26. In FIG. 9, the (shortest) air and creepage distance 28 to be maintained in accordance with SELV/outdoor requirements is shown. It extends around the insulator 23 inserted into the slot.

In this fourth embodiment, the components of the measuring circuit shown in FIG. 2 can be chosen as follows: the first inductor L1 or 22 on the secondary side has an inductance of L=1 µH. The design is similar to the B78108-S type BC from the Epcos company. The second inductor L2 or 21 on the primary side has an inductance of L=4,700 µH, with a design similar to the B78108-S type BC from Epcos. For the rest: diode D1: type 1N4148; resistor R1: 1 kOhm; capacitor C1: 330 nF; resistor R2: 6.8 kOhm; capacitor C2: 22 nF.

The layout of the Epcos B78108-S type BC can be obtained from the data sheet available from https://html.all-datasheet.vn/html-pdf/182863/EPCOS/B78108S/462/3/B78108S.html.

An embodiment of the example provides for the insulator on the ECG housing to be configured as a partition wall, e.g. in the case of an injection-molded housing as a component formed integrally on the housing wall.

Figure 10A:
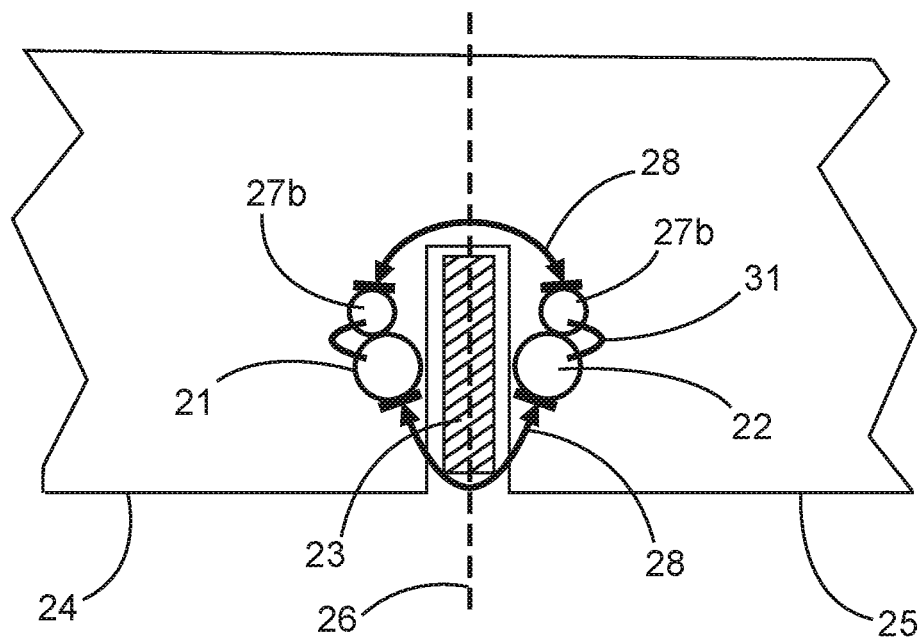
FIG. 10A shows a plan view of a fifth embodiment of the measuring arrangement of the second current sensor from FIG. 2.
Figure 10B:
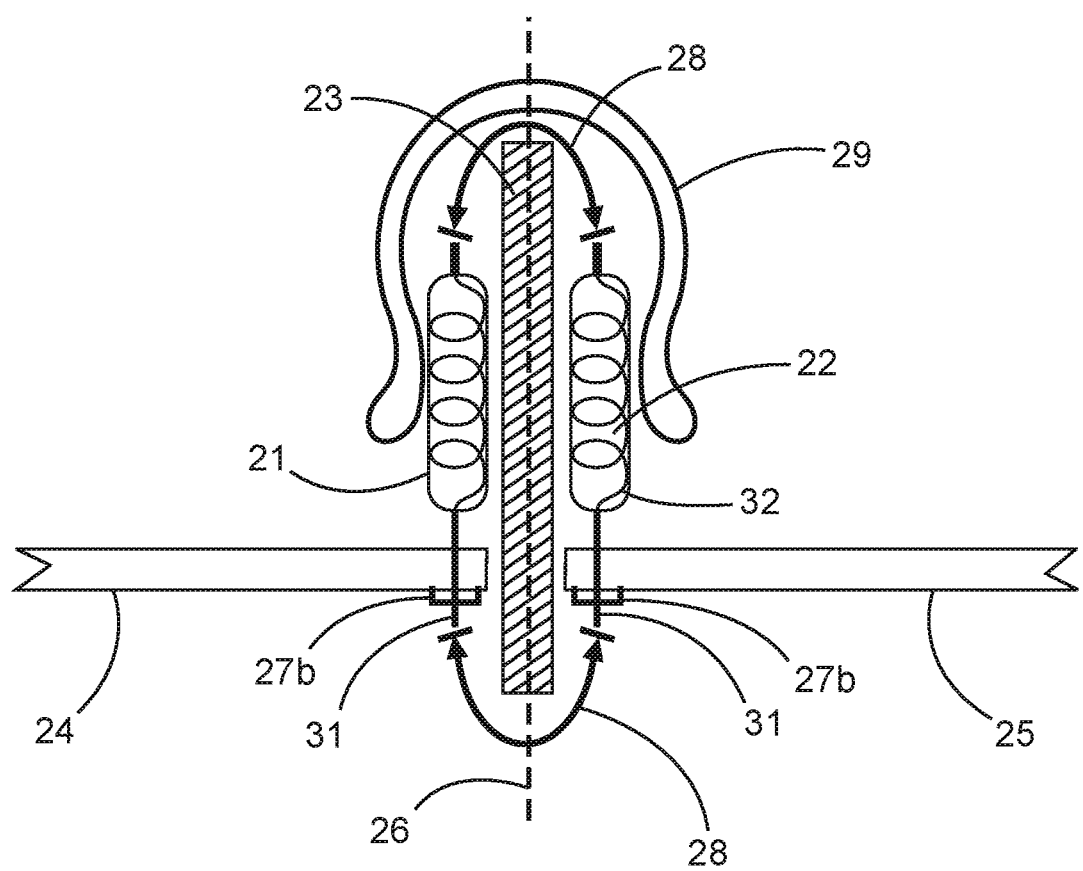
FIG. 10B shows the measuring arrangement from FIG. 10A, but in side view.

A fifth embodiment of a second current sensor 10 that can be used in the circuit arrangement according to FIG. 1 is shown in FIG. 10A and FIG. 10B. FIG. 10A shows the plan view, FIG. 10B the side view. In contrast to the fourth embodiment, here there are two vertical inductors L1 or 22 and L2 or 21 with an intervening insulator, but which are again galvanically isolated by means of an insulator of thickness D_iso introduced into a slot in the printed circuit board. As a further special feature here, a bracket 29 made of insulating material is provided. The bracket 29 is rigidly connected to the insulator 23, i.e., implemented as a holder-insulator part, e.g. as a plastic injection-molded part. During assembly, the two vertical inductors L1 or 22 and L2 or 21 are mounted first, and then the holder-insulator part (consisting of bracket 29 and insulator 23) is guided over the inductors and into the slot in the printed circuit board. As a result, the inductors L1 or 22 and L2 or 21 are guided by the bracket 29, or pressed against the insulator 23, in such a way that they rest tightly against the insulator 23 to ensure a good magnetic coupling, and are mechanically fixed so that the magnetic coupling remains permanently fixed and its size is maintained. The calibration described above of the measuring arrangement is then always performed after this fixing. The air and creepage distances 28 to be observed are also entered in FIG. 10A and FIG. 10B.

Figure 11:
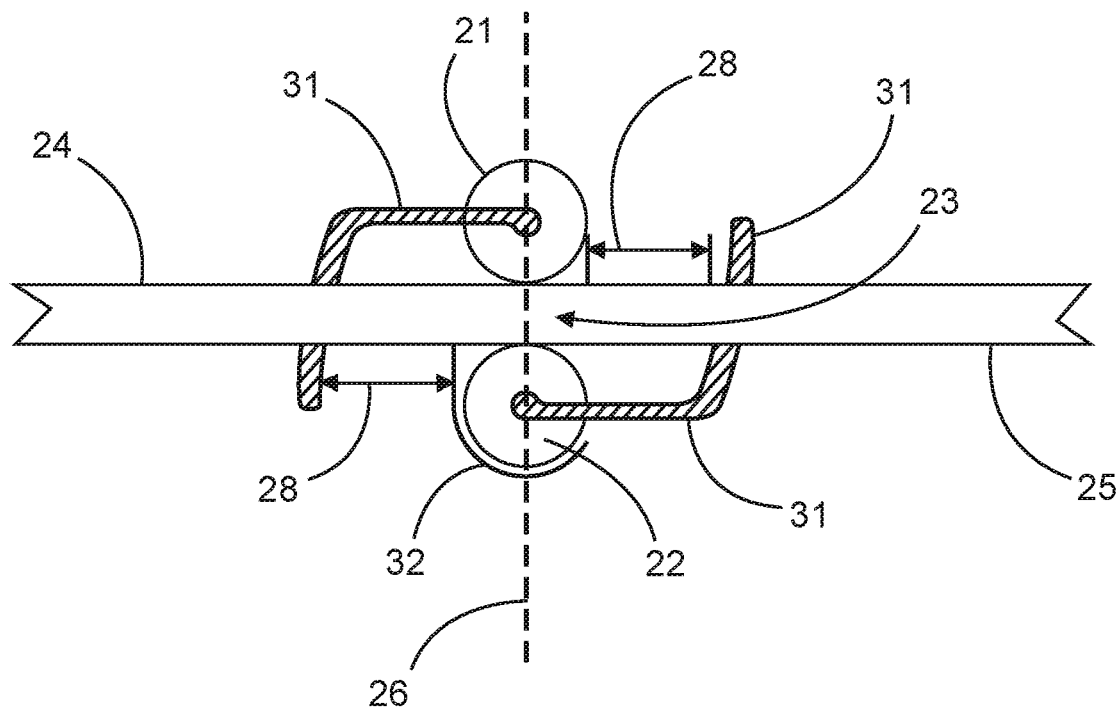
FIG. 11 shows a side view of a sixth embodiment of the measuring arrangement of the second current sensor from FIG. 2.

FIG. 11 shows a sixth embodiment of the arrangement of the second current measuring sensor 10 in FIG. 1 with two inductors with fixed intervening insulation, i.e., the circuit board as insulator 23. In this case, the inductors L1 or 22 and L2 or 21 are both provided in a wired (pin-through hole) design, i.e. they are arranged on opposite sides on the top and bottom of the printed circuit board. The air and creepage distances 28 between the inductors or their windings and the bonding wires of the vias of the respective other inductor are also entered in FIG. 11.

Figure 12:
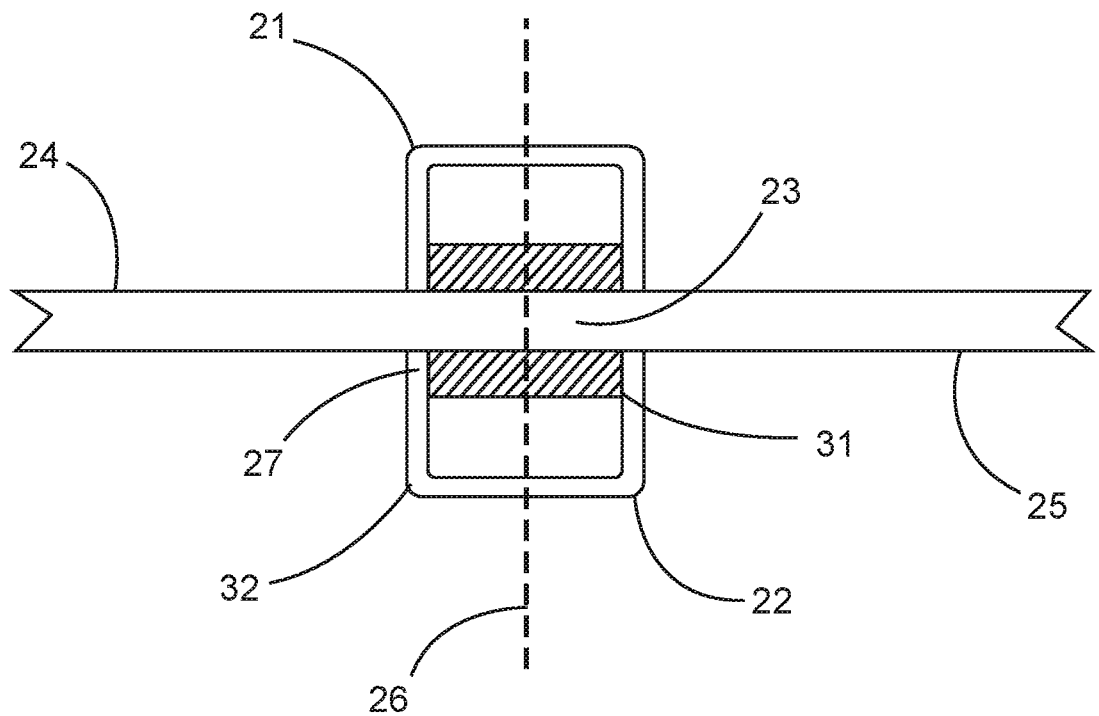
FIG. 12 shows a side view of a seventh embodiment of the measuring arrangement of the second current sensor from FIG. 2.

In FIG. 12, a corresponding seventh embodiment of the arrangement of the second current sensor 10 in FIG. 1 with two inductors, but now in an SMD design, is shown schematically.

Figure 13:
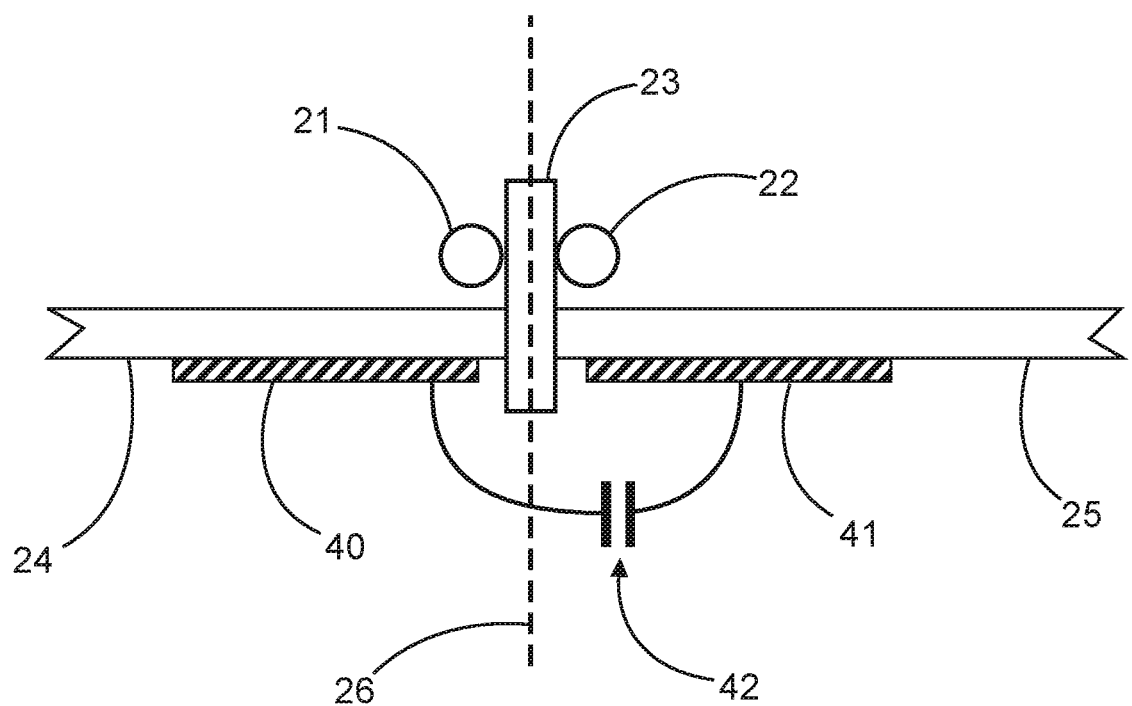
FIG. 13 shows a side view of an eighth embodiment of the measuring arrangement of the second current sensor from FIG. 2.

FIG. 13 shows an embodiment of a possible shielding of the inductors. A first shielding surface 40 is located on the primary side 24, e.g. a copper surface formed on the printed circuit board. In addition, a second shielding surface 41 is located on the secondary side 25, for example also a copper surface formed on the printed circuit board. A Y-capacitor 42 electrically connects the first shielding surface 40 on the primary side 24 to the second shielding surface 41 on the secondary side 25.

In this design, reciprocity applies, i.e. the shielding acts both against an unwanted influence of the arrangement on the stray field and to provide shielding against the unwanted influence of other components in the ECG which are located outside the measuring arrangement or the second current sensor 10. For better shielding effectiveness, a capacitor can be used that electrically connects the first shielding surface 40 on the primary side 24 to the second shielding surface 41 on the secondary side 25. The capacitor e.g. meets the SELV/outdoor requirements, e.g. as in the case of a Y1-capacitor for SELV isolation.

The following effects can be achieved by means of the embodiments described above: analogue measurement variables are measured or acquired in compliance with the requirements for insulation (SELV, outdoor), low-cost and easily available standard components are used, the inductors of the second current sensor can be manufactured in a highly automated manner, the second current sensor has a compact design, the components of the second current sensor can be mounted automatically, and finally, the second current sensor exhibits only a minor drift with temperature or over time (aging).

Various further variations and modifications of the above-described exemplary embodiments as well as combinations of individual features are possible within the scope of protection defined by the claims.

| List of reference signs: | |
| --- | --- |
| 1 | power factor correction controller (PFC) |
| 2 | first electronic switch |
| 3 | second electronic switch |
| 4 | galvanic isolation (between primary and secondary electrical circuit) |
| 5-9, 9b | possible positions of the first L1 inductor in the secondary circuit |
| 10 | second current sensor |
| 13 | measuring circuit |
| 14 | galvanic isolation (between measuring and secondary electrical circuit) |
| 15 | first current sensor |
| 16 | alternative position for the first current sensor |
| 21 | second inductor |
| 22 | first inductor |
| 23 | insulator, printed circuit board |
| 24 | primary side |
| 25 | secondary side |
| 27, 27a, | solder pad |
| 27b | solder eyelet |
| 28 | air and creepage distances required for SELV insulation |
| 29 | holding bracket for mechanical fixing of the inductors |
| 31 | bonding wire for inductors |
| 32 | winding of the inductors |
| 33 | terminal conductor track of the inductors |
| 34 | conductor track bridge for printed coil (on opposite side) |
| 35 | via |
| 37 | SMD bridge |
| 40 | first shielding surface |
| 41 | second shielding surface |
| 42 | Y-capacitor |
| 43 | magnetic field lines |
| 47 | printed coils (first inductor) |
| 72 | dimmer device |
| 75 | power transformer |
| 78 | LLC resonant converter |
| 80 | primary electrical circuit |
| 90 | secondary electrical circuit |
| 100 | input |
| 110 | output |
| C1 | capacitor (measuring circuit) |
| C2 | capacitor (measuring circuit) |
| C_a | filter capacitor (electrolytic) |
| C_R | capacitor (resonant circuit) |
| D1 | diode (measuring circuit) |

-continued

List of reference signs:

| | |
|---|---|
| D2 | diode (secondary electrical circuit) |
| D3 | diode (secondary electrical circuit) |
| $f_s$ | switching frequency |
| Ig1, Ig2 | lower/upper limit value for good correlation/calibration |
| Ik1, Ik2 | lower/upper limit value for calibration |
| I_LED | ideal dimming characteristic |
| Im1 | actual dimming characteristic (first current sensor: primary electrical circuit) |
| Im2 | actual dimming characteristic (second current sensor: secondary electrical circuit) |
| I_sek | current flow in the secondary circuit |
| L1, 22 | first inductor (secondary electrical circuit) |
| L2, 21 | second inductor (measuring circuit) |
| L_R | inductor (resonant circuit) |
| L_prim | inductor (power transformer primary side) |
| L_sek1 | inductor (power transformer secondary side) |
| L_sek2 | inductor (power transformer secondary side) |
| R1 | resistor (measuring circuit) |
| R2 | resistor (measuring circuit) |
| R_sh | shunt resistor |
| U_e1 | input voltage (circuit arrangement: input stage) |
| U_e2 | input voltage (primary circuit) |
| U_a | output voltage (secondary circuit) |
| U_M | output voltage (measuring circuit) |
| µC | control device: microcontroller |

Various aspects of this disclosure further develop a generic circuit arrangement for operating a load including a light source, in such a way that, despite the guarantee of SELV or outdoor isolation, a safe and precise dimming capability is achieved even for small dimming values, which also enables a reduction in the costs and effort involved in its production.

The starting point is a circuit arrangement for operating a load consisting of a light source, having a primary switched-mode transformer with galvanic isolation between input and output voltage. This includes a primary electrical circuit, a secondary electrical circuit and a power transformer, which causes an inductive coupling between the two. The primary electrical circuit has an input for the input voltage, and at least one electronic switch for providing a clocked current flow in the primary electrical circuit. The secondary electrical circuit, which is galvanically isolated from the primary electrical circuit, has an output for connecting the load to which the output voltage is output. The power transformer transfers the energy of a magnetic field, built up therein by the clocked current flow from the primary electrical circuit, into the secondary electrical circuit.

A control device is also provided, which controls the clocked operation of the at least one electronic switch. A clocked operation is present when the control device periodically opens and closes the electronic switch or switches in a suitable manner, so that a pulsed current flow is generated in the primary circuit. Depending on the type of converter with galvanic isolation, the power transfer can be adjusted by varying the frequency and/or the pulse width. In this respect, the invention is not limited to particular converter mechanisms as long as galvanic isolation is present.

The circuit arrangement additionally has a first inductor and a second inductor. These are different from the two inductors that usually form the power transformer, i.e. they are each configured separate from the power transformer (but electrically connected to it) in the circuit arrangement. The first and second inductors here form a measuring transformer.

The first inductor is arranged in the secondary electrical circuit in order to pass the current generated by the power transformer when the energy is transferred to the secondary electrical circuit. By way of example, the first inductor is connected in series with the inductor (or the inductors) of the power transformer in the secondary circuit, so that it is captured by the full current flow in the secondary circuit. By way of example, a filter capacitor (e.g. an electrolytic capacitor) can be connected between a node at the terminal supplying the voltage potential and a further node at the output terminal supplying the reference potential. In this case, for example, the second inductor can be connected in series at any position between the inductor of the power transformer and one of the two nodes.

The second inductor, on the other hand, is wired in a measuring circuit that is galvanically isolated from the secondary circuit and thus is physically separated and isolated from the first inductor by an electrical insulator. In various embodiments, the second inductor is spatially arranged in a stray magnetic field generated by the first inductor when the current flows, in order to generate an inductive coupling between the two inductors. The stray magnetic field is a magnetic field of lines of force, which in the case of transformers extends outside a magnetic material, for example, and is therefore not available for the actually intended use. In other words, the first and the second inductors represent different components, but they are spatially arranged in the magnetic field generated by the other. Consequently, they do not possess a common magnetic material (unlike standard measuring transformers used in the prior art). A minimum magnetic coupling between the two inductors is provided according to the invention. This is due to the fixed installation of the two components on the circuit board on which the circuit arrangement is configured. The magnetic coupling is determined by the spatial distance, the relative geometric positioning and alignment as well as the ferrite material used for the two inductors, if any, or possibly also a material installed between the two inductors. In various embodiments, however, the two inductors are also designed as separate components without a common magnetic material, thus e.g. without a common ferrite material. This enables inexpensive, easily available mass-produced and/or space-saving individual components to be used.

The current flow in the measuring circuit is generated by induction from the formation of the stray field in the first inductor. The current flow is a measure of the current flow in the secondary circuit and is determined by the coupling factor, among other things. The measuring circuit can have a design consisting of components which is suitable for outputting a measuring voltage dependent on a current flow in the measuring circuit. According to an embodiment which does not restrict the generality of the invention, a low-pass may be provided for this purpose.

The control device is connected to the output of the measuring circuit in order to determine a corresponding current flow in the measuring circuit from the output measuring voltage. It is also configured to control the clocked operation of the at least one electronic switch depending on the current flow determined. This makes it possible, for example, to adjust the switching frequency and/or the pulse width etc. in order to regulate the power used to operate the light sources (e.g. one or more LED modules), or to regulate the actual load current to a set target or dimming value.

In various embodiments, therefore, the analog measurement variable—the current flow—in the secondary electrical circuit is thus determined by means of inductive or electro-magnetic coupling of two separate inductors and used to perform the open-loop or closed-loop control of the primary electrical circuit. The galvanic isolation remains guaranteed.

As a result, the requirements of the SELV extra-low voltage or outdoor isolation can also be met. Compared to a conventional current measuring transformer, however, the complexity is significantly reduced and the costs of the components used are considerably lower. In addition, a large amount of space is saved. In various embodiments, the space available on a board (printed circuit board) between the components can be used for the insulation. According to various embodiments, the board (printed circuit board) itself can be used as an insulator if the two inductors are arranged on opposite sides of the circuit board. For the two inductors, standard easily available components can be used. These inductors are compact, highly optimized, highly automated in their production and mounting, and also inexpensive and readily available.

By the mounting and placement on the board (printed circuit board), defined couplings (coupling factors) can also be implemented. According to a particularly advantageous design, the unavoidable manufacturing tolerances and the variable ambient conditions can be allowed for by means of one-off or repeated calibrations of the measured current flow, as described below.

The converter with galvanic isolation can be designed, for example, as a resonant converter, a flyback converter, a forward converter or as a push-pull converter, wherein depending on the type of converter, one to four electronic switches (transistors, bipolar or MOSFET, etc.) are provided, the clocked operation of which is controlled by the control device accordingly. It should be noted here that the electronic control gear (ECG) which accommodates or represents the circuit arrangement can consist of one or more so-called power stages, each of which can contain a converter, or at least provide power by switched-mode operation. The first power stage in each case is operated at the line voltage. In the case of dimmable ECGs, this or a further stage also represents a corresponding dimming power stage, which specifies and initiates the dimming of the LED current by appropriate control of the power.

In connection with various embodiments, many different combinations of converters for use in ECGs are conceivable. For example, the first stage at the line voltage can be a boost converter, which also operates as a power factor correction (PFC) device, and the second stage connected to it can be an LLC type resonant converter, i.e. with LLC resonant circuit, which in turn provides the dimming power stage and the circuit arrangement according to the invention at the same time. This can be either controlled by a microcontroller or else it can be self-oscillating. Instead of an LLC-type resonant converter, a resonant converter of the LCC type etc. can also be used (with LCC resonant circuit).

Alternatively, the first stage can be represented by a flyback converter, that works with both PFC and as a dimming power stage and thus implements the elements of various embodiments. The second stage connected to it can be a downwards converter (buck converter), that functions as a mains-hum suppressor. The embodiment can be modified by operating the buck converter as a dimming power stage.

The embodiment can be further modified by omitting the second stage, i.e. the flyback converter is simultaneously a power factor correction regulator (PFC) and a dimming power stage. Many other designs of such ECGs that implement various embodiments are possible.

In all these topologies of ECGs, it may be provided to connect a filter element, e.g. a capacitor with a capacitance of e.g. 1 µF . . . 10,000 µF for an ECG operated at 50 W, at the output of the dimming power stage between the corresponding terminals supplying the voltage potential and the reference potential. The filter element attenuates or filters out the high-frequency components of the current so that they do not reach the LEDs connected to it, for example.

The dimming power stage generates one current pulse per switching period $T_s=1/f_s$ (in the case of a flyback converter) or two current pulses (in the case of LLC/LCC resonant converters). In all ECG topologies, at their output the current pulses can be converted by means of a rectifier and the filter element described into a more or less smoothed direct current, which flows through the connected light sources or LEDs.

The described ECG topologies represent various embodiments.

According to another embodiment, the control device includes a microcontroller which is connected to the output of the measuring circuit via an analog-to-digital converter. Various embodiments can be particularly advantageously realized using a microcontroller.

According to another particularly advantageous embodiment, the primary circuit includes a first current sensor which detects either a current flowing through the at least one electronic switch in the primary circuit, or alternatively the current flowing from the half-bridge or the converter on the primary side, and which is connected to the control device. In addition, the first inductor, the second inductor and the measuring circuit connected to the control device form a second current sensor, which detects the current flowing in the secondary electrical circuit indirectly by determining the current flow in the measuring circuit.

The control device in this case is configured to control the clocked operation of the at least one electronic switch depending on the current flow detected by the second current sensor or depending on the current flow detected by the first current sensor or depending on both. This control can also be configured in software in a microcontroller.

This aspect of the disclosure may be particularly advantageous because the advantages of current detection in the primary circuit and current detection in the secondary circuit, or measuring circuit, can be combined. As described, the current detection in the primary circuit (measured e.g. via a shunt resistance) suffers from loss effects in the power transformer during transfer to the secondary circuit, which are particularly noticeable at low dimming values. In such a regime of low dimming values, therefore, the current detection from the secondary circuit can be relied upon predominantly or exclusively for controlling the electronic switches. On the other hand, due to the comparatively weaker coupling of the two inductors of the second current sensor, the reliability of the current detection at very high dimming values is higher in the case of the primary electrical circuit. For this reason, at high dimming values the current detection from the primary circuit can be used, either predominantly or exclusively for controlling the electronic switches.

Likewise, in a transition region in which a dimming characteristic is reliably applied, both current measurements can be used, also in order to avoid e.g. an abrupt transition between the different data sources (corresponding to the primary electrical circuit or secondary electrical circuit) during the variation of adjusted dimming values.

According to another particularly advantageous embodiment, the control device is designed to obtain a dimming value which corresponds to a specific value for the current flow in the primary electrical circuit and in the secondary electrical circuit in relation to a corresponding maximum load current. The control device can then compare the value of the current flow corresponding to the dimming value with the current flow detected by the first current sensor or with the current flow detected by the second current sensor or with the average current flow obtained from a weighting of the two, and control the clocked operation of the at least one electronic switch depending on the result. For example, the dimming value can be obtained from a dimmer setting device via a DALI or other interface and stored in the control device.

This aspect illustrates clearly that various embodiments can be used to particular advantage in combination with dimmable circuit arrangements.

According to another embodiment, the control device is configured to control the clocked operation of the at least one electronic switch for received dimming values below a specified second limit value exclusively depending on the current flow detected via the second current sensor, wherein the second limit value is 70% or less, e.g. 30% or less, and at the same time 5% or more. In the specified dimming range, the current detection via the primary electrical circuit can be particularly unreliable, as described.

On the primary side, the current induced in the second inductor (L2) is therefore converted by an evaluation circuit of the second current sensor into a voltage which is essentially proportional to the current to be measured in the current range from zero to at least the first limit value (Ig2).

According to another embodiment, the control device is configured to control the clocked operation of the at least one electronic switch for dimming values obtained above a specified second limit value depending exclusively on the current flow detected via the first current sensor, wherein the second limit value is 5% or more, e.g. 50% or more. In the specified dimming range, the current detection in the secondary circuit from the measurement in the measuring circuit can be particularly unreliable, as described.

According to a further embodiment, the control device is designed to control the clocked operation of the at least one electronic switch by carrying out a weighting between the current flow detected by the first current sensor and the current flow detected by the second current sensor. By means of a weighting, for example, the two above-mentioned dimming ranges, in which the electronic switch or switches are only controlled depending on the one current detection or the other current detection, can be combined in a transition region in which the weighting is varied gently and continuously, for example, to avoid sudden changes during the regulation.

According to a further embodiment, the control device is configured, as described above, to calibrate the values for the current flow measured by the second current sensor based on the current flow measured by the first current sensor. This is advantageous because the coupling of the two inductors of the current measuring transformer is clearly limited (example coupling factors are between approximately 0.1 and 0.9, whereas conventional couplings known from the prior art are between 0.95 and 0.9999) and therefore the current flow in the current measuring circuit does not necessarily correspond to that in the secondary circuit. This weak coupling leads to a large scatter in the respective values achieved; for example, unavoidable errors in the mutual placement when mounting the inductors on the circuit boards also lead to a scatter in the resulting coupling factors.

According to a further embodiment, the control device is designed to perform the calibration at at least one dimming value specified by the control device in an interval between 5% and 70% of a current flowing at full LED current without dimming (corresponding to 100%), e.g. between 10% and 50% of the current flowing at full LED current without dimming, inclusive of the interval limits in each case. This dimming range has proved to be particularly suitable, since the deviation between the actual characteristic curves based on the current measurement in the primary electrical circuit and in the secondary electrical circuit, on the one hand, and the ideal dimming characteristic curve on the other hand, is comparatively small in this dimming range. This medium dimming range makes it possible to carry out any meaningful and reliable calibration at all. Several dimming values can also be used for the calibration, or an entire range can be traversed (scanned). Mathematical processing and statistical fitting methods can also be performed.

According to another embodiment, the control device is designed to carry out the calibration automatically during operation and triggered by an event, the event being for example:

the detection of the expiry of a predefined absolute time interval or a specific operating time interval;

the detection of a change in an operating parameter recorded by a sensor, such as a temperature, which is greater than a limit value;

the detection of the input voltage being powered on or powered off;

the detection of a transition from the light "OFF" state in a standby mode of the circuit arrangement into the light "ON" state in a dimming mode of the circuit arrangement or vice versa;

the detection of a change in the dimming value specified by the control device, wherein the calibration is only performed when the modified specified dimming value lies in an interval between 5% and 70% of a current flowing at full LED current without dimming, e.g. between 10% and 50% of the current flowing at full LED current without dimming, inclusive of the interval limits in each case.

This list is not exhaustive. The event-driven calibration makes it possible to allow for variations in the environment, such as changed temperatures, etc.

According to another embodiment, a calibration value for the current flow detected in the primary electrical circuit and/or the current flow recorded in the secondary electrical circuit, measured in particular by individual measurement during the production of the circuit arrangement, is stored in the control device and the control device is designed to carry out the corresponding calibration with this calibration value. The one-off calibration enables a highly accurate calibration determined by precise measuring equipment.

Other embodiments relate to the spatial arrangement and design of the inductors.

According to an embodiment, the first and/or the second inductor is an inductor printed on a printed circuit board. In this case, the conductor tracks are printed on the printed circuit board in a spiral pattern (angular or non-curved path not excluded), i.e., the inductor extends radially in two dimensions from a central point on the printed circuit board. Both inductors can be designed in this way. Ideally, they are then e.g. arranged symmetrically to each other on opposite sides of the printed circuit board, which then also acts as an insulator.

However, in an embodiment only one of the two inductors is printed and the other is formed as described below:

According to another embodiment, the first or the second inductor (or even both inductors) is an inductor in the form of a surface mounted device or a wired inductor, which in the latter case can be mounted vertically or horizontally on a printed circuit board.

According to another embodiment, the second inductor is a BC choke with a large stray field. Since such standard components are particularly cheap, using two inductors of this type in combination results in a particularly significant cost reduction.

According to another embodiment, the second inductor has a non-annular closed ferrite core, e.g. having a bar shape, dumb-bell shape or U-shape. With these types of inductors, a particularly effective stray field is achieved.

According to another embodiment, the spatial arrangement of the first and second inductors relative to each other after assembly on a printed circuit board is such that the magnetic fields generated by the current flow are coupled with a coupling factor in an interval from 0.98 to 0.01, e.g. 0.98 to 0.05, e.g. 0.90 to 0.10, e.g. 0.70 to 0.10. Such values for the coupling factors have proved in experiments to be completely adequate for current detection in the secondary circuit.

According to a further embodiment, the electrical insulator has a material thickness in the case of a solid material in a range from 0.4 mm to 1 mm, e.g. 0.8 mm to 1.0 mm, or in the case of a plurality of layers a total thickness in a range of 0.25 mm or more. This enables the requirements for insulation sufficient for an SELV extra-low voltage to be met.

According to a further embodiment, the circuit arrangement includes the circuit board or the printed circuit board on which the components of the circuit arrangement are arranged and interconnected, wherein the first inductor and the second inductor are arranged adjacent to each other on the same side of the circuit board and the printed circuit board has a slot in an area between the two inductors, through which the insulator extends perpendicular to the plane of the printed circuit board.

According to an alternative embodiment, the circuit arrangement also includes the printed circuit board on which the components of the circuit arrangement are arranged and interconnected, wherein the first inductor is a printed coil and this and the second inductor are arranged on the opposite sides of the printed circuit board, and wherein one end of the second inductor is positioned opposite a central region of the printed coil of the first inductor in a direction parallel to the printed circuit board plane, and the other end of the second inductor (L2, 21) is opposite an area outside of the printed coil (47) in this direction.

By way of example, the outer winding of the printed coil is located in an area in the center between the one end and the second end of the second inductor.

In addition, the first inductor can have an inductance in the range 0.03 µH to 10 µH, e.g. 0.06 µH to 1 µH, and the second inductor can have an inductance in the range 200 µH to 10,000 µH, e.g. 1,000 µH to 5,000 µH.

In addition, the first inductor can be designed as a printed coil e.g. having 1 to 20 windings, e.g. 2 to 10 windings, and the second inductor (L2, 21) can have an inductance in the range 200 µH to 10,000 µH, e.g. 1,000 µH to 5,000 µH.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for operating a load consisting of a light source, comprising a primary-side switched-mode converter with galvanic isolation between input and output voltage, the circuit arrangement comprising:
    a primary electrical circuit having an input for the input voltage and at least one electronic switch for providing a clocked current flow in the primary electrical circuit;
    a secondary electrical circuit which is galvanically isolated from the primary electrical circuit and has an output for connecting the load at which the output voltage is output;
    a power transformer which transfers the energy of a magnetic field, built up therein by the clocked current flow from the primary electrical circuit, into the secondary electrical circuit;
    a control device that controls the clocked operation of the at least one electronic switch;
    a first inductor and a second inductor, each configured to be separate from the power transformer;
    wherein the first inductor is arranged in the secondary electrical circuit in order to pass the current generated by the power transformer when the energy is transferred to the secondary electrical circuit,
    wherein the second inductor is wired in a measuring circuit that is galvanically isolated from the secondary electrical circuit and in this case is physically separated and isolated from the first inductor by means of an electrical insulator,
    wherein the second inductor is spatially arranged in a stray magnetic field generated by the first inductor when current flows in order to produce an inductive coupling, the two inductors being designed as individual components without a common magnetic material, optionally without a common ferrite material;
    wherein the measuring circuit comprises an output at which a measuring voltage is output that depends on a current flow in the measuring circuit, which is induced in the second inductor by the first inductor by the current flow in the secondary electrical circuit, and
    wherein the control device is connected to the output of the measuring circuit in order to determine a corresponding current flow in the measuring circuit from the output measuring voltage, and is configured to control the clocked operation of the at least one electronic switch depending on the current flow determined.

2. The circuit arrangement of claim 1,
    wherein the control device comprises a microcontroller connected to the output of the measuring circuit via an analog-to-digital converter.

3. The circuit arrangement of claim 1,
    wherein in the primary electrical circuit, a first current sensor is provided which detects a current flowing through the at least one electronic switch in the primary electrical circuit or detects a current flowing on the primary side from a half-bridge or from the converter, and which is connected to the control device, and
    wherein the first inductor, the second inductor and the measuring circuit connected to the control device form a second current sensor, which detects the current flowing in the secondary electrical circuit by determining the current flow in the measuring circuit,
    wherein the control device is configured to control the clocked operation of the at least one electronic switch depending on the current flow detected by the second current sensor or depending on the current flow detected by the first current sensor or depending on both.

4. The circuit arrangement of claim 3,
wherein the control device is designed to obtain a dimming value, in each case corresponding to a specific value for the current flows detected by the first and second current sensors in relation to a corresponding maximum load current,
wherein the control device compares the value for the current flow corresponding to the dimming value with the current flow detected by the first current sensor with the current flow detected by the second current sensor and/or with the average current flow obtained from a weighting of the two, and controls the clocked operation of the at least one electronic switch depending on the result.

5. The circuit arrangement of claim 4,
wherein the control device is configured to control the pulsed operation of the at least one electronic switch for dimming values obtained below a specified second limit value, depending exclusively on the current flow detected by the second current sensor;
wherein the second limit value is in the range 4% to 50% of a current that flows at full LED current without dimming.

6. The circuit arrangement of claim 4,
wherein the control device is configured to control the pulsed operation of the at least one electronic switch for dimming values obtained above a specified first limit value, depending exclusively on the current flow detected via the first current sensor,
wherein the first limit value is in the range 5% to 60% of a current that flows at full LED current without dimming, and
wherein the first limit value is above or at the same level as a second limit value.

7. The circuit arrangement of claim 4,
wherein the control device is configured to control the clocked operation of the at least one electronic switch by performing a weighting between the current flow detected in the primary electrical circuit and the current flow detected in the measuring circuit.

8. The circuit arrangement of claim 4,
wherein the control device is configured to calibrate the values for the current flow detected by the second current sensor.

9. The circuit arrangement of claim 8,
wherein the control device is designed to perform the calibration in a range of dimming values in which both the current flow measured by the first current sensor and the current flow measured by the second current sensor have a close correlation with each other and/or with an actual current flow.

10. The circuit arrangement of claim 8,
wherein the control device is configured to perform the calibration at at least one dimming value specified by the control device in an interval between 4% and 60% of a current flowing at full LED current without dimming, inclusive of the interval limits in each case.

11. The circuit arrangement of claim 8,
wherein the control device is designed to carry out the calibration automatically during operation and triggered by an event.

12. The circuit arrangement of claim 8,
wherein the control device is configured, starting from an initial dimming value below a second limit value, to set a new dimming value that is within the calibration range for a period of time and then to perform the calibration within a period of time of less than 100 ms, and after this calibration procedure to set the original dimming value again, which is below the second limit value.

13. The circuit arrangement of claim 12,
wherein the control device is configured to carry out a dimming compensation phase for a further period of time directly following the calibration period, during which the duration and the current flow are selected such that the mean value of the current flowing within the sum of the two time periods is essentially equal to the current flow corresponding to a dimming value specified by the microcontroller, with which the circuit arrangement is subsequently operated.

14. The circuit arrangement of claim 8,
wherein a calibration value for the current flow detected in the primary electrical circuit and/or the current flow recorded in the measuring circuit is stored in the control device and the control device is configured to carry out the corresponding calibration with this calibration value.

15. The circuit arrangement of claim 1,
wherein the first inductor is an inductor printed on a printed circuit board and the second inductor is an SMD-type inductor or a wired inductor positioned horizontally or vertically on the printed circuit board,
wherein the printed circuit board forms an insulator that provides the galvanic isolation between the inductors.

16. The circuit arrangement of claim 1,
wherein the second inductor has a non-annular closed ferrite core, having a bar shape, dumb-bell shape or U-shape.

17. The circuit arrangement of claim 1,
wherein the second inductor is a BC choke with a large stray field.

18. The circuit arrangement of claim 1,
wherein the spatial arrangement of the first and second inductors relative to one another after assembly is such that the magnetic fields generated by the current flow are coupled with a coupling factor in an interval from 0.98 to 0.05.

19. The circuit arrangement of claim 1,
wherein the electrical insulator has a material thickness in the case of a solid material in a range from 0.4 mm to 1 mm, or in the case of a plurality of films a total thickness in a range of 0.25 mm or more.

20. The circuit arrangement of claim 1,
wherein the circuit arrangement comprises the printed circuit board on which the components of the circuit arrangement are arranged and interconnected,
wherein the first inductor and the second inductor are arranged adjacent to each other on the same side of the printed circuit board and the printed circuit board has a slot in an area between the two inductors, through which the insulator extends perpendicular to the plane of the printed circuit board.

21. The circuit arrangement of claim 1,
wherein the circuit arrangement comprises the circuit board on which the components of the circuit arrangement are arranged and interconnected,
wherein the first inductor is a printed coil and the second inductor are arranged on the opposite sides of the circuit board, and
wherein one end of the second inductor is opposite a central region of the printed coil of the first inductor in a direction parallel to the printed circuit board plane, and the other end of the second inductor is opposite an area outside the printed coil in this direction.

22. The circuit arrangement of claim 1,
wherein the first inductor has an inductance in the range 0.03 µH to 10 µH, and
wherein the second inductor has an inductance in the range 200 µH to 10,000 µH.

23. The circuit arrangement of claim 1,
wherein the first inductor is designed as a printed coil.

\* \* \* \* \*